(12) United States Patent
Graves et al.

(10) Patent No.: US 6,229,788 B1
(45) Date of Patent: May 8, 2001

(54) METHOD AND APPARATUS FOR TRAFFIC SHAPING IN A BROADBAND FIBER-BASED ACCESS SYSTEM

(75) Inventors: Alan Frank Graves, Kanata; Andrew Jocelyn Timms, Ottawa; David Anthony Fisher, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/084,370

(22) Filed: May 27, 1998

(51) Int. Cl.[7] ................................................. H04B 10/24
(52) U.S. Cl. ......................... 370/230; 359/118; 725/118
(58) Field of Search .......................... 359/118; 370/230, 370/231; 725/105, 114, 116, 117, 118, 119

(56) References Cited

U.S. PATENT DOCUMENTS 5,189,671 * 2/1993 Cheng ................................... 370/94.1
5,699,176 * 12/1997 Cohen .................................. 359/118

* cited by examiner

*Primary Examiner*—Melvin Marcelo

(57) ABSTRACT

The invention is a novel method and apparatus for controlling the flow of traffic between a host digital terminal (HDT) and a plurality of optical network units (ONUs). Each ONU is connected to the HDT by optical fiber and to a plurality of subscribers by a respective plurality of subscriber drops (typically pre-existing copper twisted pairs). The bandwidth on the fiber, although large, is usually inferior to the total bandwidth that can be transmitted across the subscriber drops. Therefore, both upstream and downstream traffic may become congested at various "choke points" under certain circumstances of usage. Ordinarily, the data is buffered at the choke points, leading to the installation of large queues within each ONU. This solution is not only expensive, but is inadequate since the required queue size is dependent on the maximum transaction size, which has no hard upper bound. In contrast, the present invention provides a traffic shaper located in the HDT, which gives centralized control of the traffic flowing to and from the ONUs. Consideration of the priority and destination of each traffic cell is taken into account by the traffic shaper to ensure that the capacity of the fiber and of the individual drops is never exceeded, irrespective of the transaction sizes, thereby eliminating the need for costly buffers in the outside plant. Any maintenance or repairs of the traffic shaper can be easily effected without field visits, due to its centralized location.

38 Claims, 10 Drawing Sheets

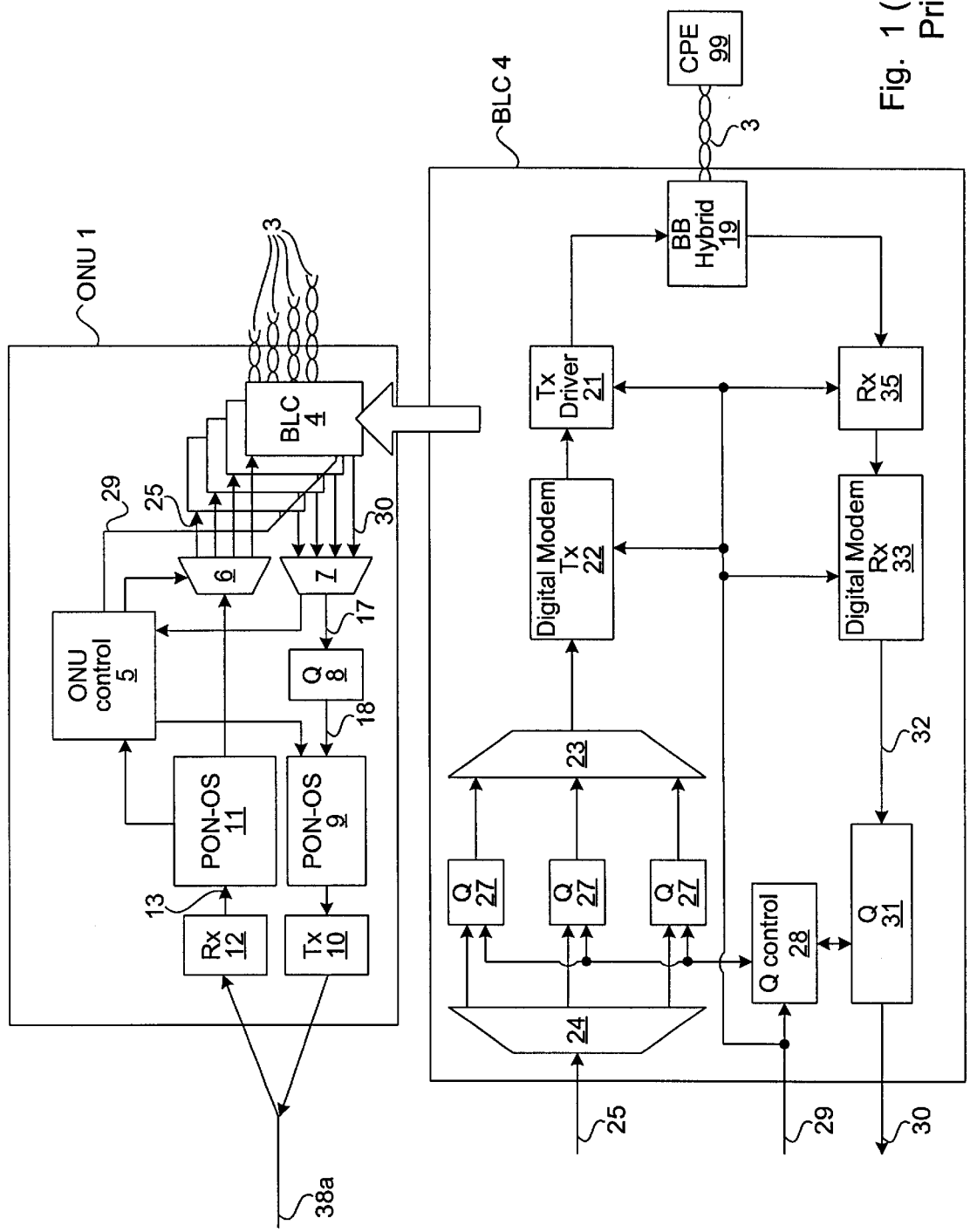
Fig. 1 (continued) Prior Art

METHOD AND APPARATUS FOR TRAFFIC SHAPING IN A BROADBAND FIBER-BASED ACCESS SYSTEM

FIELD OF THE INVENTION

The present invention relates to broadband communication networks, and particularly to a method and apparatus for controlling traffic flow through the network in order to minimize the cost of buffering data in outside-plant components.

BACKGROUND OF THE INVENTION

In order to enable the delivery of broadband services by present and future fiber-based data transport systems, optical fiber is being extended deeper into the network, having led to the deployment of optical network units (ONUs) to a point within several hundred (or a few thousand) feet of the end user. The ONUs each serve a plurality of subscribers and communicate via a fiber optic feeder cable with a host digital terminal (HDT) that is usually placed in a central office location and is connected to the remainder of the network. The relatively short drop length between the ONUs and the individual subscribers reduces frequency-dependent signal losses on the residual copper twisted pairs and allows the transmittal of high-bandwidth data across these drops to and from the subscribers.

In a packet switched or cell switched network (such as ATM), packets or cells travel along virtual circuits (VCs) established between communicating entities, such as subscribers or file servers. Typically, there are three main classes of traffic that can be delivered to a subscriber, namely broadcast (BC), continuous bit rate (CBR) and unspecified bit rate (UBR).

For the case of BC traffic, a plurality of BC channels (such as television channels) are transmitted along the fiber leading from the HDT to the ONUs, each occupying a constant bandwidth irresepective of the number of subscribers actually using that channel at a given time. At each ONU, the BC channels being subscribed to by a subscriber are replicated and carried to the subscriber by respective "bearers" of traffic occupying one BC channel's worth bandwidth on the drop. Therefore, during peak viewing times, the total BC drop bandwidth delivered to all the subscribers connected to an ONU (or to a group of ONUs) far exceeds the bandwidth taken up by BC traffic on the fiber feeder.

A CBR service (such as a telephone call) occupies a negotiated, constant and guaranteed bandwidth on the fiber feeder and drop cable for each individual VC that is set up, and therefore the total bandwidth taken up by a CBR service on both the feeder and the drop directly is dependent on the number of subscribers using CBR services at a given time and on the number of CBR services used by each subscriber. VCs for carrying CBR traffic are usually only set up if there is bandwidth available on both the feeder and the drop, after having met the bandwidth requirements of BC traffic.

Finally, UBR is considered the lowest priority traffic, and is often the cheapest available service, from the subscriber's point of view. Since UBR does not guarantee a bit rate, it is more often discussed in the context of a service rather than a circuit. Typically, UBR is used to transmit files and other non-time-critical data. UBR services occupy respective portions of the residual bandwidth on both the feeder and the drop, allocated after all BC and CBR circuits have been set up. The residual bandwidth is shared among the total number of requested UBR services, which is a function of time.

Designers of broadband access systems must be careful to consider traffic congestion encountered at so-called "choke points", i.e., parts of the network at which the output bandwidth capacity is less than the total input bandwidth capacity. For example, in the downstream (network-to-subscriber) direction, it is typically the case that more bandwidth is available on the fiber feeder between the HDT and the ONUs than what can be supplied to any one subscriber over a copper drop. Therefore, a large file transfer from a file server or similar source in the external network may be propagated to the ONU serving the recipient subscriber at close to the maximum capacity of the fiber feeder to that ONU, but cannot be delivered at this rate to the subscriber, due to the lower bandwidth capacity of the subscriber's copper drop. The excess delivery rate into the ONU from the fiber, relative to the capacity of the copper drop will result in the ONU becoming overloaded with data.

Moreover, the total number of subscribers multiplied by the (relatively low) available bandwidth per copper loop may exceed the total bandwidth capacity of the fiber feeder in both the upstream or downstream directions. This scenario is particularly harmful when each customer establishes a CBR connection, and can ultimately lead to the delay or loss of ATM cells and a degraded quality of service (QoS).

In the prior art, congestion is commonly treated by placing a buffer (or "queue") of a fixed, predetermined size in both directions for every subscriber line card at the ONU. The main goal of this approach is to provide enough buffering margin or traffic buffer capacity so that a transient peak bandwidth demand (in either direction) results in the excess instantaneous data rate from the summation of all the services flowing through the choke points in question being temporarily stored in the buffers and emptied at the available rate.

The colocation of queues in the ONU is done in the hope that there is enough room in the buffer to handle the surplus of incoming data until there is either an increase in available output bandwidth or a decrease in the total input bandwidth across the summation of services. Neither one of these conditions is met during a prolonged excessive bandwidth request, and any fixed queue size is liable to overflow and cause loss of data. Although by increasing the buffer size, a longer bandwidth peak can be accommodated, the required buffer size is proportional to the maximum possible transaction size, which has been found to be continually on the rise. Deciding on a particular size instantly limits the effectiveness of the buffer for handling peak bandwidth demands in the future. Clearly, prior art solutions involving buffers are only temporary fixes for avoiding loss of data due to congestion at choke points.

It is useful to consider a concrete example illustrating the difficulties with the current state of the art, in which the available downstream and upstream bandwidths are respectively 600 and 155 Megabits per second (Mbps). Furthermore, let there be 8 ONUs (each serving 24 subscriber lines) connected to the same fiber in a passive optical network (PON). Thus, if a subscriber is demanding a 4-Megabyte file transfer during a period of low overall system usage, then the entire downstream bandwidth capacity of 600 Mbps is available, and the file arrives at the ONU within 52 ms.

However, the maximum transmission rate per line (i.e., per subscriber loop) is typically on the order of 20 Mbps downstream and 2 Mbps upstream. Thus, in the same 52 ms time period, only 130 kilobytes of the original 4-Megabyte file can be delivered to the subscriber from the ONU choke point. The residual 3.87 Megabytes must be buffered in the ONU's downstream path for that subscriber so as to be delivered over the next 1.55 seconds. In general, ninety-seven percent (i.e., (600−20)/600) of the file to be transferred must be stored at the ONU. Clearly, a serious disadvantage is that the amount of memory to be installed in the ONU on a per-subscriber basis is a function of maximum file size (nowadays in the order of several dozen megabytes), which leads to large, expensive, power-hungry and unreliable components that in turn present the service provider with high maintenance costs.

In another scenario, if all subscribers would simultaneously use the available 2 Mbps data rate to transmit data to their respective line cards, then the total demanded instantaneous upstream bandwidth on the fiber would be 2×24×8=384 Mbps, against an available 155 Mbps on the fiber feeder. An upstream data transfer of 1 Megabyte for each subscriber would require the buffering of approximately 600 kilobytes in the upstream path of each line card in every ONU. Again, the required size of the buffer memory is dependent on the maximum file (or transaction) size, in this case being 60% of the maximum file size. Clearly, it is always possible to envisage an extended peak bandwidth demand that floods the buffer of any given size, which can potentially lead to the entire transaction being obliterated.

The performance of prior art systems is further limited by an unwelcome dependency on traffic characteristics. For instance, a large, simple buffer in each line card may be adequate for storing cells that provide a single service but not for multiple services per line card, due to the differing priorities of those services. This requires a more complex buffer structure, which further complicates the ONU. Furthermore, even more complex queues are required when attempting to manage the buffering of different traffic classes forming part of a single cell stream. Thus, it is only a substantially complex buffer which can pass high-priority data that is "sandwiched" between two runs of low-priority data. Clearly, traffic shaping queues which control the delay of packets, as well as peak and average bandwidth, dramatically amplify system cost and are still not immune to buffer overflow.

SUMMARY OF THE INVENTION

It is the object of the invention to obviate or mitigate one or more disadvantages of the prior art.

Therefore, the present invention may be broadly summarized as a method of downstream data transmission for use in an access system comprising a host digital terminal (HDT) connected by optical fiber to a plurality of optical network units (ONUs), each ONU being connected to a respective plurality of subscribers by a respective plurality of subscriber drops, the method comprising: determining which drops from among the subscriber drops the downstream data is destined for, said drops being destination drops; determining the downstream bandwidth available on the fiber and on the destination drops; and transmitting the downstream data only if there is sufficient downstream bandwidth on the fiber and on the destination drops.

The invention may be summarized according to a second broad aspect as a method of transmitting upstream data, for use in an access system comprising a host digital terminal (HDT) connected by optical fiber to a plurality of optical network units (ONUs), each ONU being connected to a respective plurality of subscribers by a respective plurality of subscriber drops, the method comprising: determining which drops from among the subscriber drops intend to transmit upstream data, said drops being source drops; determining the upstream bandwidth available on the fiber and on the source drops; and allowing the transmittal of upstream data only if there is sufficient upstream bandwidth on the fiber and on the source drops.

The present invention can be used in an access system comprising a host digital terminal (HDT) connected by optical fiber to a plurality of optical network units (ONUs), each ONU being connected to a respective plurality of subscribers by a respective plurality of subscriber drops, the invention being summarized as a traffic shaper for transmitting an output stream of traffic cells from the HDT to the subscribers, the traffic shaper comprising: control means for determining the bandwidth available on the fiber and on the subscriber drops; and remapping means for controllably reordering and releasing an input stream of traffic cells in accordance with the bandwidth available on the fiber and on the subscriber drops, thereby to form the output stream of traffic cells.

The invention may be summarized in accordance with another broad aspect as a host digital terminal, comprising: a first plurality of optoelectronic converters for exchanging upstream and downstream traffic cells with a core network via optical fiber; a digital switch matrix connected to the first plurality of optoelectronic converters, for routing the upstream and downstream traffic cells to and from the core network in accordance with a controllable routing map; an HDT control processor connected to the digital switch matrix for controlling the routing map of the digital switch matrix; a plurality of base stations for formatting the downstream traffic cells into downstream subframes comprising a control channel containing control information and a traffic channel containing the downstream traffic cells, and for formatting upstream subframes received from the ONUs into upstream traffic cells; a second plurality of optoelectronic converters for exchanging subframes with the ONUs; and a traffic shaper connected between the digital switch matrix and the second plurality of optoelectronic converters, for controlling the transmission of downstream traffic cells, the traffic shaper comprising control means for determining the bandwidth available on the fiber and on the subscriber drops, and remapping means for controllably reordering and releasing an input stream of downstream traffic cells received from the digital switch matrix in accordance with the bandwidth available on the fiber and on the subscriber drops, thereby to form an output stream of downstream traffic cells delivered to a corresponding one of the second plurality of base stations.

According to yet another broad aspect, the invention may be summarized as an access system comprising: a host digital terminal (HDT) for connection to a core network; and a plurality of optical network units (ONUs) connected by optical fiber to the HDT, each ONU being connectable to a respective plurality of subscribers by a respective plurality of subscriber drops; wherein the HDT comprises a traffic shaper for transmitting an output data stream from the HDT to the subscribers, the traffic shaper comprising control means for determining the bandwidth available on the fiber and on the subscriber drops; and remapping means for controllably reordering and releasing an input stream of traffic cells in accordance with the bandwidth available on the fiber and on the subscriber drops, thereby to form the output data stream.

According to still another broad aspect, the invention may be summarized as an access system, comprising: a plurality of optical network units (ONUs), each ONU being connectable to a respective plurality of subscribers by a respective plurality of subscriber drops; and a host digital terminal (HDT) connected by optical fiber to the ONUs and being connectable to a core network, for relaying downstream data from the core network to the ONUs and for relaying upstream data from the ONUs to the core network; wherein the HDT comprises a first plurality of optoelectronic converters for exchanging upstream and downstream traffic cells with a core network via optical fiber; a digital switch matrix connected to the first plurality of optoelectronic converters, for routing the upstream and downstream traffic cells to and from the core network in accordance with a controllable routing map; an HDT control processor connected to the digital switch matrix for controlling the routing map of the digital switch matrix; a plurality of base stations for formatting the downstream traffic cells into downstream subframes comprising a control channel containing control information and a traffic channel containing the downstream traffic cells, and for formatting upstream subframes received from the ONUs into upstream traffic cells; a second plurality of optoelectronic converters for exchanging subframes with the ONUs; and a traffic shaper connected between the digital switch matrix and the second plurality of optoelectronic converters, for controlling the transmission of downstream traffic cells, the traffic shaper comprising control means for determining the bandwidth available on the fiber and on the subscriber drops, and remapping means for controllably reordering and releasing an input stream of downstream traffic cells received from the digital switch matrix in accordance with the bandwidth available on the fiber and on the subscriber drops, thereby to form an output stream of downstream traffic cells delivered to a corresponding one of the second plurality of base stations; and wherein each ONU comprises an optoelectronic converter connected to the optical fiber joining that ONU to the HDT; an out station connected to the optoelectronic converter for formatting the downstream subframes arriving from the HDT into a stream of intermittent downstream traffic cells and for formatting a stream of upstream traffic cells arriving from the corresponding subscriber drops into upstream subframes; a demultiplexer connected to the out station means for determining which drop among the subscriber drops connected to that ONU each downstream traffic cell is destined for; a plurality of line cards connected to the demultiplexer, each line card comprising a downstream buffer for temporarily storing the downstream traffic cells arriving from the HDT, interface means for interfacing to the associated subscriber drop, an upstream buffer for storing the upstream traffic cells arriving from the subscriber drop; a multiplexer connected to the line cards, for combining the traffic cells arriving on each of the line cards into the stream of upstream traffic cells; and a anti-jitter buffer having a corresponding length connected between the multiplexer and the out station for temporarily storing the stream of upstream traffic cells prior tp transmission by the ONU.

The present invention provides simple and substantially identical ONUs, each with a plurality of simple and substantially identical line cards. Since the bit rates of the services provided to the subscriber are known at the HDT, it is the HDT which will ensure that the data flowing to and from individual subscribers is always guaranteed not to exceed the available bandwidth at the various choke points, irrespective of the actual transaction sizes or number of services flowing through each drop. The bulk of the access system's memory requirements are concentrated in a centralized location, thereby liminating maintenance and replacement costs in case of failure.

DESCRIPTION OF THE PRIOR ART

In order to appreciate the benefits of the present invention, it is useful to first provide an overview of the structure and function of a conventional prior art system.

Figure 1:
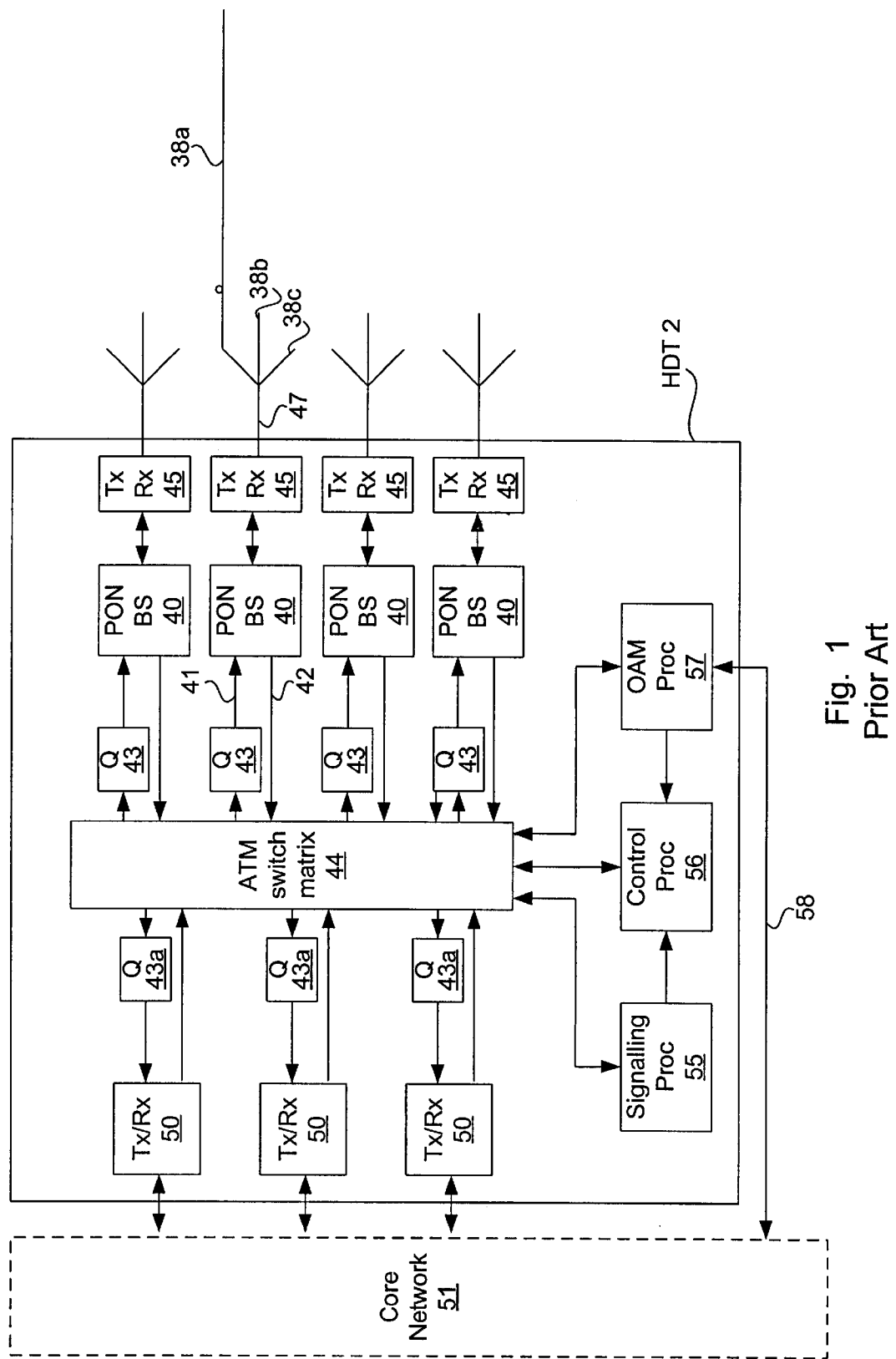
FIG. 1 is a high-level block diagram of a prior art access subsystem.

Access to a fiber-based communications network is typically provided by an access system comprising an HDT joined by fiber optic cable (a fiber feeder) to a plurality of ONUs either by forming individual, respective point-to-point links or in a network topology such as a synchronous optical network (SONET) ring or a PON. Illustrated in FIG. 1 is an ONU 1 connected to an HDT 2 in a PON, wherein a strand of fiber 47 from the HDT is separated by a passive optical splitter (not shown) into a number of fiber umbilicals 38$a,b,c$ leading to each ONU (of which only one is shown). Separate fibers can be used for transporting optical traffic in the downstream and upstream directions, although bidirectional traffic can be carried by a single fiber using wavelength division multiplexing.

The ONU 1 generally comprises components for transporting downstream data, including a receiver 12 for converting optical data on the fiber umbilical 38$a$ to a digital electronic signal 13, which passes through a downstream PON-outstation (PON-OS) 11 followed by a demultiplexer 6. A number of demultiplexed signal lines 25 leave the demultiplexer 6 and enter respective broadband line cards (BLCs) 4, which typically interface with customer-premises equipment (CPE) 99 via loops of twisted pair drops 3.

The ONU 1 also comprises an ONU control processor 5, which receives downstream control data by virtue of being connected to the downstream PON-OS 11, and is also connected to the demultiplexer 6 over whose routing map it exerts control. The ONU control processor 5 further provides a control line 29 to the BLCs.

Within each BLC 4, the downstream signal line 25 enters a demultiplexer 24 which separates incoming traffic according to traffic class, storing any as yet undelivered data inside respective queues 27. The output rate of each queue is controlled by a queue control block 28 receiving instructions on control line 29. The data output by the queues 27 is remultiplexed into a sequence reflecting the traffic priority (i.e., high-priority first) by a controllable multiplexer 23 and sent to the CPE 99 in an appropriate format by a broadband hybrid 19 after first passing through a digital modem 22 and a transmitter driver 21, both under control of the ONU control processor 5 through control line 29.

In the reverse direction, the hybrid 19 of each BLC 4 provides a digital upstream signal to a queue structure 31 via a receiver 35 and a digital modem 33, both of which are controlled by the ONU control processor 5 via control line 29. Depending upon the nature of the upstream data path properties, the queue structure 31 may either resemble that formed by the demultiplexer 24, queues 27 and multiplexer 23, or it may be a single, very long buffer, under control of the queue control block 28. The output 30 of the queue structure 31 of each BLC 4 is fed to a multiplexer 7, which produces a data stream 17 destined for the HDT 2.

The data stream 17 passes through an upstream buffer 8, and subsequently through an upstream PON-OS 9 and an optical transmitter 10 on its way towards the HDT 2 along fiber umbilical 38a. The multiplexer 7 and upstream PON-OS 9 are controlled by respective signals from the ONU control processor 5.

The HDT 2 interfaces with the optical fiber 47 by means of a respective one of a plurality of optoelectronic transceivers 45. To each transceiver 45 is connected a PON base station (PON-BS) 40 which regulates the allocation of downstream bandwidth across all ONUs in a PON. A significant element of the HDT is a digital switch matrix 44, typically a high speed ATM switch fabric, which is connected to each PON-BS 40 by an upstream path 42 and a downstream path 41. A queue 43 is usually installed in the downstream path between the switch matrix 44 and each PON-BS 40 to temporarily store excess downstream data from the switch matrix 44 until it can be accommodated by the bandwidth of the PON-BS 40.

The switch matrix 44 exchanges data with an outside "core" network 51 by another plurality of optoelectronic transceivers 50 and respective buffers 43a leading from the switch matrix 44. Also connected to the switch matrix 44 are a signalling processor 55, a control processor 56 and an operation, administration and maintenance (OAM) processor 57. Control, provisioning and maintenance instructions and responses are communicated by a control line 58 linking the OAM processor 57 to elements in the management layer of the core network 51.

Figure 2:
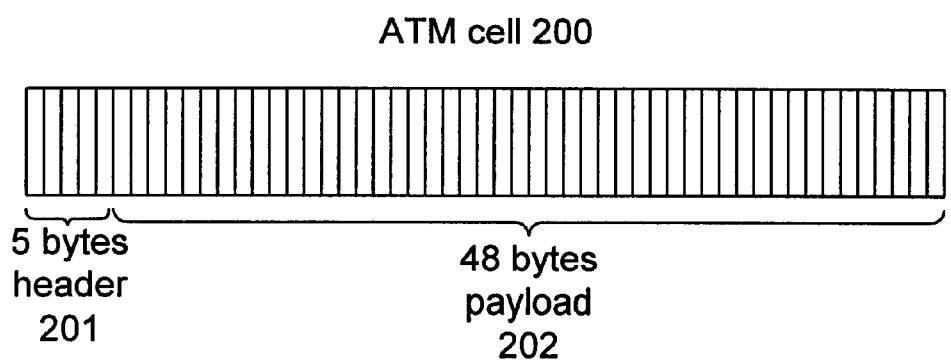
FIG. 2 shows an asynchronous-transfer-mode cell.

During operation of the prior art system, data flow generally consists of groups of ATM cells travelling in either direction through the HDT 2 and ONU 1. The upstream and downstream paths have differing traffic and timing characteristics and can be considered separately. In the downstream direction, data from the core network 51 entering the HDT through transceivers 50 may require reformatting of the signalling information associated with each circuit by the signalling processor 55 in order to map the network-side signalling protocols to the access-side signalling protocols, thereby to provide the switch matrix 44 with streams of appropriately formatted ATM cells. As seen in FIG. 2, an ATM cell 200 possesses a five-byte header 201, identifying a virtual circuit and/or virtual port (VC/VP), and a 48-byte payload 202. Without loss of generality, the subsequent description is simplified by considering only the information carried by the VC. For a downstream ATM cell entering the switch matrix 44, the VC implicitly identifies not only a destination BLC, but also a class of service (BC, CBR or UBR). It is not unusual for multiple VCs and multiple classes of service to be established with the same BLC.

If the normal practice of over-provisioning the switch fabric capacity is followed, then the switch matrix 44 is lightly loaded, i.e., it is fast enough to route all incoming ATM cells as soon as they arrive, a plausible assumption in today's era of 10 Gigabit-per-second (Gbps) switches. Thus, the switch matrix 44 routes each cell towards the ONU corresponding to the BLC associated with the VC/VP specified in the header of that cell. The actual mapping of VC/VP to physical location of BLC is specified by the control processor 53.

Considering the cells destined for the ONU 1, they share the link 41 to the PON-BS 40 with cells destined for other ONUs on the same PON. If the data from the switch matrix 44 arrives faster than it can be handled by the PON-BS 40, then the excess data is buffered in the corresponding queue 43. The data stream output by the PON-BS 40 consists of ATM cells grouped into "subframes" according to their destination ONU, along with address data and control information, which are then fed to the transceiver 45. Usually, the subframes destined for different ONUs are concatenated by the PON-BS 40 and form a complete "frame" of 125 microseconds (which is compatible with existing synchronous switched networks).

Further downstream at the ONU 1, the frames are converted into electronic format by the receiver 12 and fed to the PON-OS 13, which has the responsibility of (a) selecting only the subframes destined for that ONU and disregarding the rest; (b) extracting the control information from the incoming stream and sending it to the ONU control processor 5; and (c) sending the remaining ATM cells to the demultiplexer 6. The control information may comprise, for example, the VC/VP-to-BLC mapping for control of the demultiplexer 6, which accordingly routes the cells to the appropriate BLC 4. Since it is assumed that the capacity of each demultiplexer port is such that the full input bandwidth from the PON could, if necessary, be accommodated by any port, the ONU control processor 5 does not control the output data rate of the demultiplexer 6.

At the BLC, the incoming ATM cells 25 are then separated according to VC and/or service class by the demultiplexer 24 and inserted into a corresponding queue 27. While the demultiplexer 6 per se can be implemented such that it is not a choke point, the downstream bandwidth constraints of the BLCs 4 lead to the requirement of buffering within queues 27. The rate at which the queues 27 are emptied is controlled by the queue control block 28, which typically bases its decisions on a service class hierarchy, releasing any buffered BC and CBR traffic before sending any UBR traffic. Upon exiting the parallel queues 27, the cells are reassembled by the multiplexer 23 into a cell stream that is formatted by the modem 22 and sent to the CPE 99 through the transmitter driver 21, hybrid 19 and copper drop 3.

Considering now the upstream direction, data transmitted from the CPE 99 is converted into a digital stream 32 of ATM cells by the modem 33 after passing through the hybrid 19 and the receiver 35. The stream 32 passes through the queue structure 31 on its way to the multiplexer 7, where data streams from several BLCs are combined into a single data stream 17. As previously discussed, the queue structure 31 within each BLC 4 may be a simple ATM cell buffer or may be similar to the combination of the demultiplexer 24, queues 27 and multiplexer 23 present in the downstream path.

Before being converted into an optical signal by the transmitter 10, the stream 17 of ATM cells is arranged into subframes and transmitted by the upstream PON-OS 9 at a rate that is controlled by the ONU control processor 5. The buffer 8 stores excess ATM cells that cannot be sent immediately upon arrival at the upstream PON-OS 9. (Such buffer was not required in the downstream path, as it was assumed that the output ports of demultiplexer 6 could handle the full PON bandwidth.) The ONU control processor 5 also manages the queue structure 31, and receives subscriber-generated control information detected by the multiplexer 7.

Since many ONUs share the same fiber 47, a mechanism for coordinating the transmission of upstream data from each ONU 1 is required, so as to avoid the data "burst" of one ONU overwriting that of another. Accordingly, the ONU control processor 5 interprets timing information based on control information in the subframes arriving downstream from the PON-BS. This timing information is generated by a marshalling circuit in the PON-BS 40, such as that disclosed in draft specification I.983 submitted to the ITU. The net overall effect is that upstream subframes arriving at the HDT are separated by small time spans during which no valid data is transmitted, also known as guard bands.

At the HDT 2, the PON-BS 40 accepts the subframes containing ATM cells in electronic format from the transceiver 45, reads any control information that may have been inserted by the upstream PON-OS 9 in the ONU 1, and sends individual ATM cells to the switch matrix 44 for further routing. Cells destined for the core network pass through queues 43a and through transceivers 50 after being reformatted into an appropriate format by the signalling processor 55. Although its links are not explicitly shown, the control processor 56 communicates control information with each PON-BS 40 and with the OAM processor 57.

In the prior art, some of the most troublesome and expensive components of an ONU are the upstream and downstream traffic flow management systems, specifically the queue 8 in each ONU, as well as the demultiplexer 24, queues 27, multiplexer 23 and queue control block 28 in each BLC. There are many situations in which it becomes clear that either the queues are not sufficiently large or that the queue control block 28 is excessively complex. As has already been discussed, inadequate queue size is a problem faced during a very large file transfer to one BLC in the absence of other traffic on the PON, whereas the queue control block 28 has to have a high processing capability to handle extreme cases of multiple traffic classes and large numbers of VCs through individual BLCs.

A queue that is too meagre in size to handle the downstream data rates supplied to it can be supported by additional buffers between the demultiplexer 6 and each line card. However, this creates a new problem: if the buffer devoted to UBR traffic in the BLC is full, then the additional buffer outside the BLC will begin to fill. Since this new buffer stores all classes of traffic, any CBR data "caught" in this buffer will have to wait until the UBR buffer in the BLC is at least partially empty. However, the bit rate of UBR traffic is not guaranteed (by definition), and therefore the CBR traffic in the additional outside buffer may have to wait an indefinite amount of time before being delivered to the customer, which would violate the BC or CBR service delivery parameters, causing a potential service failure, which is likely to be unacceptable to the end user. Clearly, such a queue placed between the demultiplexer 6 and each line card requires additional arbitration logic, rendering the entire system more complicated and expensive, not to mention the fact that further loss of data is still not averted.

In sum, the conventional system architecture, with respect to traffic flow, results in the installation of a set of large buffers that is complex, dependent on service characteristics and traffic classes, and rife with associated control problems. The ONU thus suffers from increased complexity, cost, power consumption and physical size, more frequent failures, while still leaving the system prone to corrupt transmission due to buffer overflow.

Detailed Structural Description of the Preferred Embodiment

Figure 3:
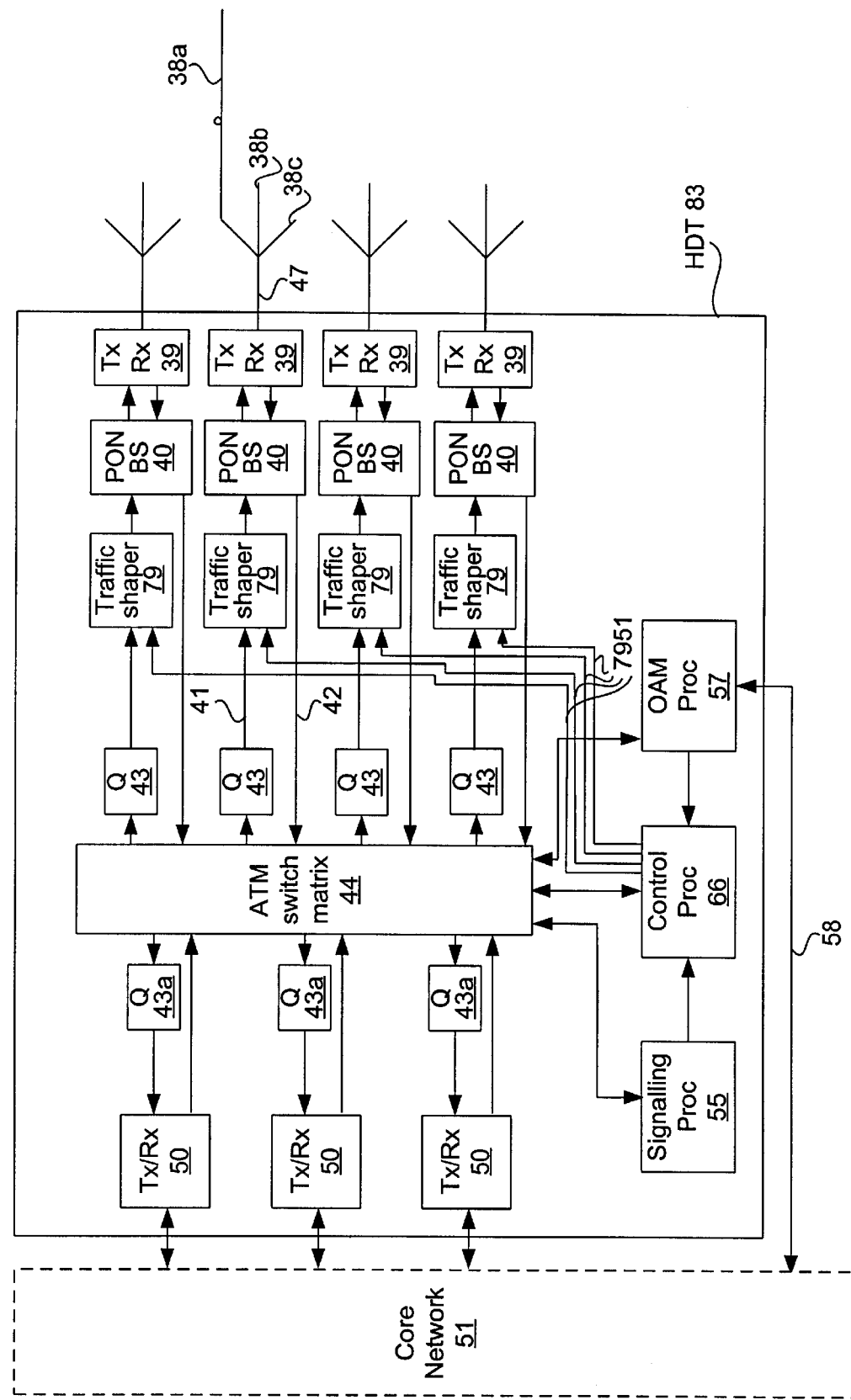
FIG. 3 is a high-level block diagram of an access subsytem comprising an HDT and an ONU in accordance with the present invention.
Figure 3:
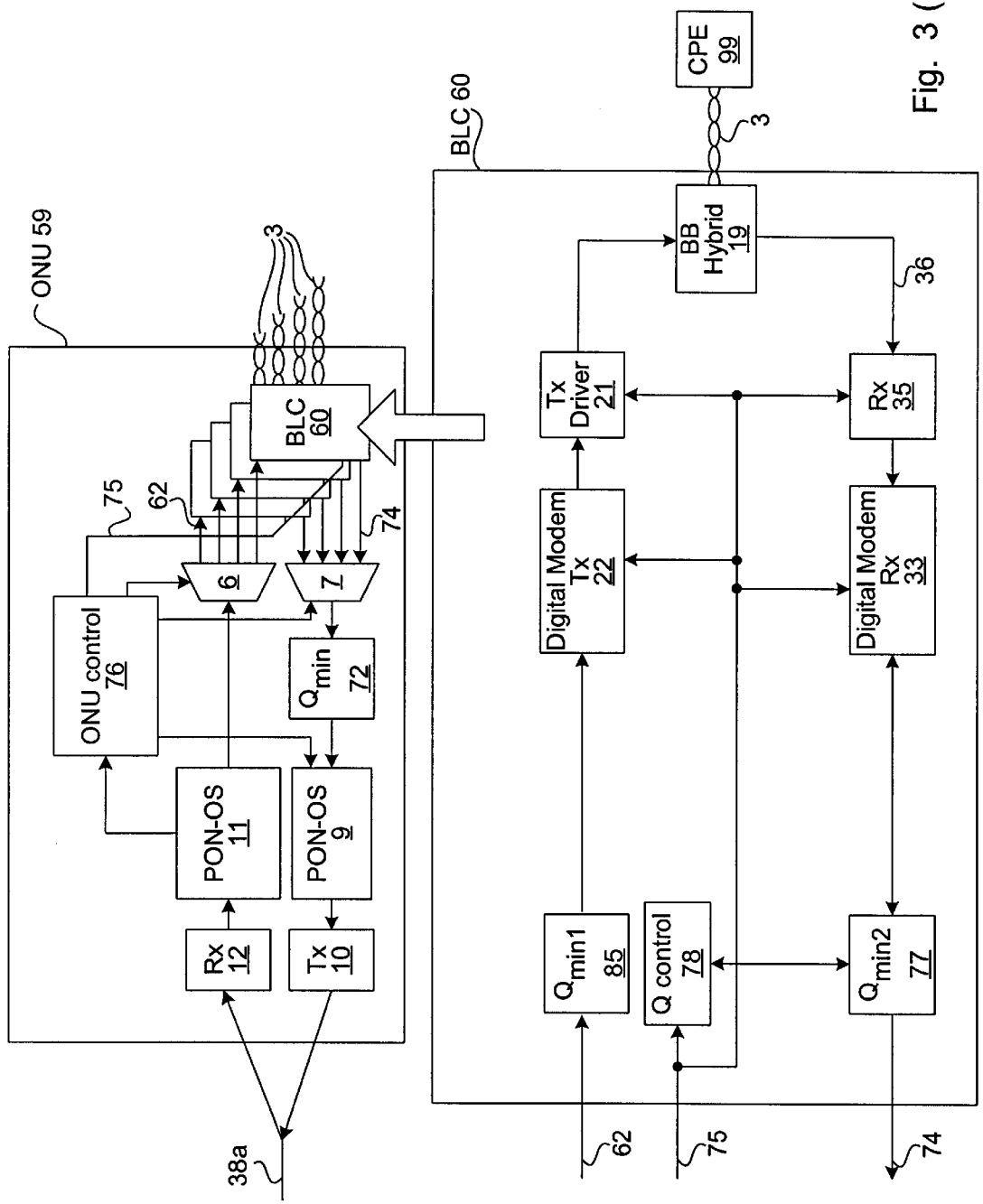

Reference is now made to FIG. 3, which depicts an access system in accordance with the present invention, comprising an HDT 83 connected between a core network 51 and a plurality of ONUs 59 (only one of which is shown) in a PON configuration. A SONET ring or a plurality of individual point-to-point links can also be used to interconnect the ONUs and HDT. Without loss of generality, it can be assumed that a bidirectional optical fiber feeder 47 connects the HDT 83 to an optical splitter (not shown), which passively splits/joins a plurality of fiber umbilicals 38a,b,c leading to respective ONUs. Alternatively, there may be a pair of dedicated optical fibers along each link to separately transport upstream and downstream traffic.

As in the prior art, the HDT 83 comprises a switch matrix 44 connected in a known way to a signalling processor 55, a control processor 66 and an OAM processor 57 connected by its own control line 58 to the management layer of the core network 51. The control processor 66 may pass through the switch matrix before gaining access to the OAM processor 57. The switch matrix is preferably a routing switch capable of handling ATM cells at a high rate (e.g., 10 Gbps), and is connected to the core network 51 through a plurality of transceivers 50.

In the inventive HDT 83, the switch matrix 44 is also connected to a plurality of "traffic shapers" 79, of which there is one for each access transport system (in this case, one per PON). The purpose of the traffic shapers is primarily to control the rate of downstream data flow on each VC in order to prevent congestion from taking place at downstream choke points, while maintaining efficient usage of the available bandwidth on the multiplexed transmission path from the HDT to multiple ONUs, in this case shown as a PON. Each traffic shaper 79 is connected to a PON-BS 40 and to a transceiver 39 for interfacing with the optical fiber feeder leading to the ONUs on that PON. In addition, the traffic shapers 79 are connected to the control processor 66 in the HDT 83 by a respective set of control lines 7951, which provide bandwidth strobes, VC-to-service maps and other relevant information to various parts of each traffic shaper, as described below. Again, these links may be established by passing through the switch matrix 44.

If it is assumed that the switch matrix 44 is lightly loaded (i.e, that it does not cause congestion), then incoming packets need not be buffered. However, because the switch is so fast, the downstream packets headed for the traffic shapers 79 or the upstream packets headed for the transceivers 50 normally do need to be buffered by respective queues 43,43a. If the input stage of the traffic shaper 79 is sufficiently fast, then it can absorb packets as fast as they can be output by the switch matrix 44, obviating the need for buffering at the corresponding queue 43. For a heavily loaded switch matrix, buffers may be required in both directions of traffic flow at each of its ports.

It can readily be seen that the only significant structural difference between prior art HDT 2 and the inventive HDT 83 is the presence of a traffic shaper 79 for each access transport system, in this case a PON, along with the associated control infrastructure that includes a modified control processor 66. The remaining components may take on any form that is known or used in the art. For example, each transceiver 39 may consist of a separate optoelectronic transmitter and receiver. Another embodiment might feature a single PON-BS that amalgamates upstream and downstream functionality in a single block.

Although similar in structure to the described prior art components, the ONUs 59 and BLCs 60 employed in the inventive access system differ in that the memory requirements and complexity are considerably reduced. Thus, the inventive ONU 59 comprises, as in the prior art, an optical receiver 12, a downstream PON-OS 11 and a demultiplexer 6 in its downstream path leading to a plurality of BLCs 60 via respective signal lines 62.

The ONU 59 also comprises a multiplexer 7 in the upstream path, whose output passes through a minimal buffer 72 on its way to being transmitted by an upstream PON-OS 9 and optically converted in the usual way by a transmitter 10. The purpose of buffer 72 is to store the upstream traffic from the subscriber until the upstream PON-OS 9 is permitted to transmit in the upstream direction in accordance with a time-division multiple access scheme. The required size of buffer 72 will depend on the speed with which an upstream bandwidth request can be negotiated once the buffer begins to fill. This is a function of the delay of the upstream bandwidth allocation process, but is independent of the transaction size. Buffer 72 is always needed but may be internal to the upstream PON-OS 9.

Also part of the ONU 59 is an ONU control processor 76 for reading control information from the downstream PON-OS 11 and providing a routing map to the demultiplexer 6. The ONU control processor 76 also supplies a control signal 75 to each BLC 60, as well as burst timing information to the upstream PON-OS 9. The link between the downstream PON-OS 9 and the ONU control processor 76 may be physical, as illustrated in FIG. 3, or the ONU control processor 76 may simply monitor cells at the output of the downstream PON-OS 9 in search of those which are destined for it.

Within each ONU 59, the line interfacing is performed by a plurality of BLCs 60, each comprising a broadband hybrid 19 for connection to a copper twisted pair leading to a respective CPE 99. In the downstream path, each BLC 60 accepts a respective one of the signal lines 62 from the demultiplexer 6, leading to a minimal downstream queue 85 connected to a digital modem 22, a transmitter driver 21 and the broadband hybrid 19. The queue 85 is controlled by a control block 78 based on information contained in the control signal 75 received from the ONU control processor 76.

It is to be noted that the queue 85 in each line card need only accommodate enough ATM cells to account for so-called multiplexing jitter, which occurs when a certain number of cells arrive at the queue (from the demultiplexer 6) at a high bit rate but can only leave the queue 85 at a significantly lower bit rate. As will be shown hereunder, the inventive system can limit the number of cells to be stored by the queue 85 to the number of cells contained in a single frame. This value is several orders of magnitude less than the storage capacity required in the prior art and is independent of the size of a requested transfer.

In the upstream path, the hybrid 19 in each BLC 60 provides an upstream signal 36 to a receiver 35, which is connected to a digital modem 33, followed by a minimal upstream queue 77. The queue 77 is also controlled by the queue control block 78, and provides an upstream signal 74 to the multiplexer 7. The form of the upstream queue 77 may be the same as in the prior art, i.e., separated into parallel queues for each traffic class and recombined by a demultiplexer. Alternatively, the upstream queue 77 may be a simple "first in, first out" buffer.

Preferably, buffer 77 is much smaller than the queue 31 in the prior art, since the rate of upstream data trasmitted by the CPE would preferably be controlled by a centralized control processor in the HDT. Whereas traffic shaping in the downstream direction can be relegated to a single component or software program in conjunction with the control processor 66, the distributed nature of the upstream transmission path calls for a distributed traffic shaping control mechanism involving the control processor 59 and each CPE 99. The present invention applies to the control of traffic in either the upstream or downstream direction, or both.

Figure 4:
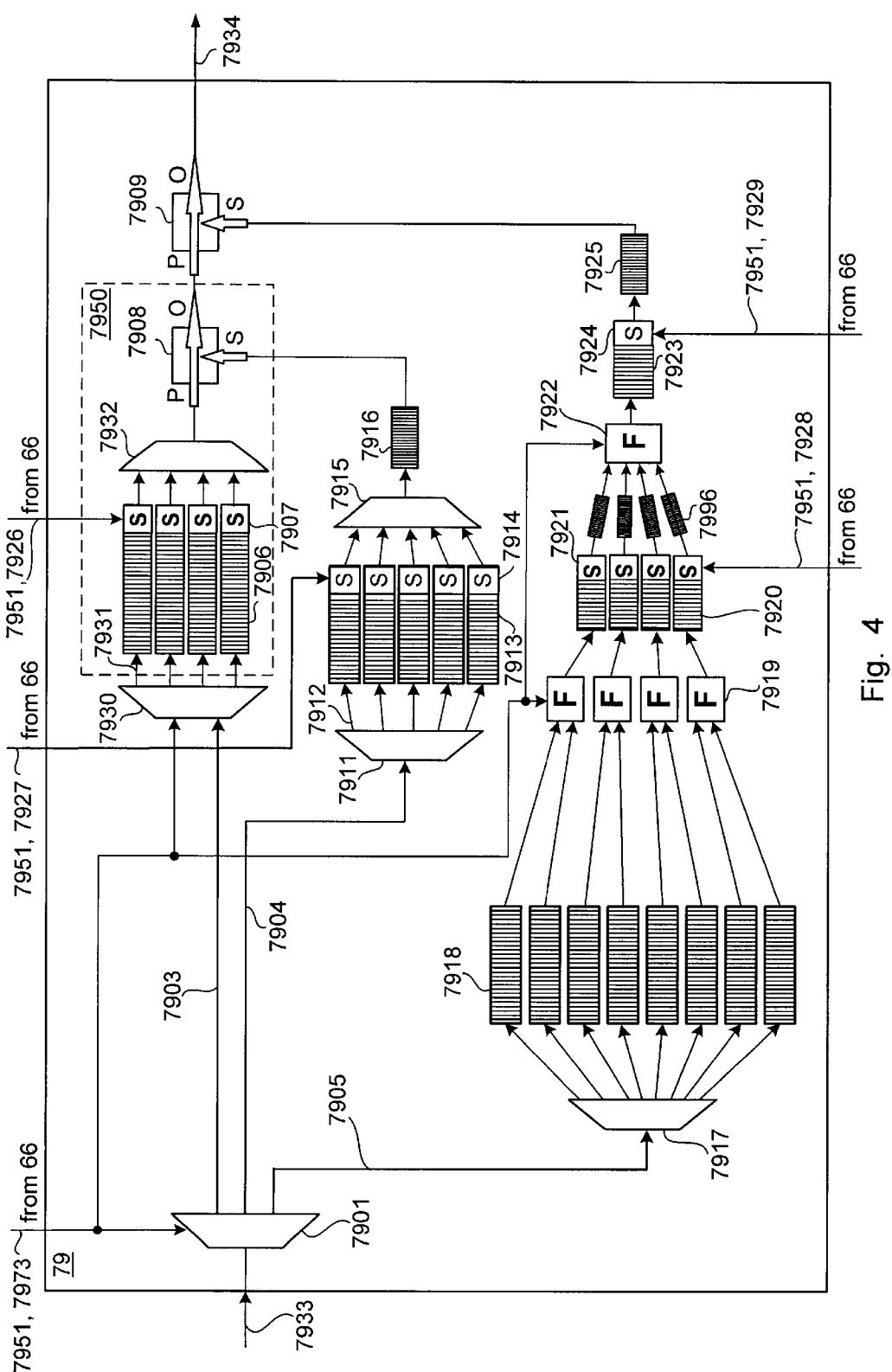
FIG. 4 is a block diagram of a traffic shaper for use in the HDT of the inventive network of FIG. 3.

One possible embodiment of an inventive downstream traffic shaper is shown in FIG. 4. The traffic shaper 79 comprises a demultiplexer 7901 for routing incoming downstream ATM cells 7933 according to a mapping of VC/VP versus traffic class supplied by the HDT control processor 66 via control line 7973. The output of the demultiplexer 7901 is thus separated into three streams 7903–7905 according to the three different service classes (7903 for BC, 7904 for CBR, 7905 for UBR). The three streams 7903–7905 of ATM cells pass through an arrangement of other components, which implement a series of service-class-dependent shaping and prioritization functions, alongside recombination functions, before exiting the traffic shaper as a single stream 7934 of ATM cells ready to be grouped into subframes by the PON-BS 40.

Structurally, the BC stream 7903 is connected to the input of a demultiplexer 7930, which extracts a plurality of BC streams 7931 from the BC stream 7903. Each separate BC stream 7931 respectively enters a buffer 7906 at whose output is repectively located a simple shaper 7907. The simple shapers (or "pacers") 7907 are components that control the respective rates at which cells leave buffers 7906, as controlled by respective bandwidth strobes 7926 from the control processor 66. The control processor 66 itself receives provisioning commands indicating the bandwidth of the individual BC channels from a services provisioning manager (SPM) in the core network. The output of each buffer 7906 is subsequently remultiplexed by multiplexer 7932 and the multiplexed signal enters the primary input port P of a priority gate 7908.

A priority gate is a component which, in addition to having a primary input port P, comprises a secondary input port S and an output port O and exerts the following input-output relationship: "any cells present at the primary input P are directly routed to the output O. If no cells are present at the primary input P, then cells present at the secondary input S appear at the output O." That is to say, traffic at the primary input P has priority over traffic at the secondary input S.

Considering now the CBR stream 7904, it enters a demultiplexer 7911, where it is demultiplexed on a per-VC or per-VP basis, depending on the required traffic shaping characteristics, producing individual CBR streams 7912. The individual streams 7912 are connected to respective buffers 7913, whose outputs are provided to a multiplexer 7915 at a rate controlled by respective simple shapers 7914. These simple shapers 7914 respectively modify the individual buffer output rates according to bandwidth strobes 7927 received from the control processor 66. The output of multiplexer 7915 is connected to the secondary input S of priority gate 7908 via a queue 7916 for storing excess cells that are not immediately accepted by the priority gate 7908.

As for the UBR stream 7905, it is separated by a demultiplexer 7917 on a per-service basis (as there may be more than one service associated with a single copper drop). The individual streams are buffered by respective queues 7918, which are then regrouped on a per-drop basis by a set of "fair-share" multiplexers 7919. These components allot an equal number of packets in their respective output streams to each input, while ignoring inputs that do not present any data, i.e., the multiplexers 7919 do not consider UBR circuits that are unoccupied.

The output of each fair-share multiplexer 7919 is thus a stream of low-priority cells corresponding to one BLC, which is then buffered by a respective queue 7920 whose output rate is controlled by a respective simple shaper 7921. The simple shapers 7921 are under the influence of respective bandwidth strobes 7928 from the control processor 66. The streams of cells exiting the buffers 7920 are optionally buffered by respective queues 7996 whose outputs are then regrouped by another fair-share multiplexer 7922.

The output of the fair-share multiplexer 7922 is preferably buffered by a queue 7923 whose output cell rate is determined by a shaper 7924 controlled by a bandwidth strobe 7929 from the control processor 66. (It is to be noted that although fair-share multiplexer 7922 is preferably one which devotes equal amounts of output bandwidth to all of its inputs, it can implement other "fair-share" schemes, such as one which measures and equalizes the level to which the buffers 7920 are filled.) The output of buffer 7923 passes through a final buffering stage at a queue 7925 whose output is connected to the secondary input S of another priority gate 7909.

Optionally, the queue 7923 and shaper 7924 can be bypassed. Instead of receiving bandwidth strobes directly from the control processor 66, shapers 7921 may receive bandwidth strobes calculable from the bandwidth strobes 7928 and from a "buffer full" signal that is fed from the buffer 7925 and which indicates the level to which buffer 7925 is occupied.

Finally, the priority gates 7908, 1909 are connected in such a way that the output port O of priority gate 7908 feeds the primary input port P of priority gate 7909. This establishes a hierarchy, whereby BC traffic has priority over CBR traffic (because of priority gate 7908), which has priority over UBR traffic (because of priority gate 7909). The data at the output O of priority gate 7909 forms a sequence of ATM cells that are subsequently fed to the PON-BS.

It has been assumed that the demultiplexer ports on demultiplexers 7930, 7911, 7917 and their respective sets of output buffers 7906, 7913, 7918 are themselves not choke points, i.e., their instantaneous bandwidth handling capacity is taken to be sufficiently high. If this is not the case and there are some bandwidth handling constraints (e.g., through having chosen a power-efficient buffering technology for one or more sets of buffers), then it is necessary to introduce further buffering between the input demultiplexer 7901 and the next stage of demultiplexing. Furthermore, if the demultiplexer 7901 is not designed to handle the incoming bandwidth, it is necessary to buffer data prior to entering the demultiplexer 7901, either internally to the traffic shaper or, as in FIG. 3, a queue 43 may be installed directly at the output of the switch matrix 44.

Although the structure of the inventive traffic shaper has been described with reference to actual physical blocks, it is to be understood that its realization may be radically different. For instance, the desired remapping of cells from an input sequence to an output sequence could be achieved by implementing the traffic shaper as a very large and fast random access memory which is accessed and controlled by a traffic shaping control processor. This processor may be separate from the control processor 66 in the HDT 83. Irrespective of the chosen implementation, the functionality of the traffic shaper remains the same, and is set forth hereunder in further detail.

Detailed Description of Downstream Operation of the Preferred Embodiment

Operation of the inventive system in the downstream direction between the core network 51 and the switch matrix 44 is identical to that described when discussing the prior art system. After passing through the switch matrix 44, where it is routed, the downstream data travels towards the appropriate PON-BS but first passes through an inventive traffic shaper 79.

As shown in FIG. 4, at the traffic shaper 79, the input sequence 7933 of ATM cells is remapped into the output sequence 7934 of ATM cells, based on control information supplied by the control processor. The demultiplexer 7901 reads the VC/VP information in the header of each input cell and then consults a mapping supplied by the control processor 66 via control line 7973 in order to determine the traffic class, i.e., BC, CBR or UBR, of the particular VC/VP.

Figure 5:
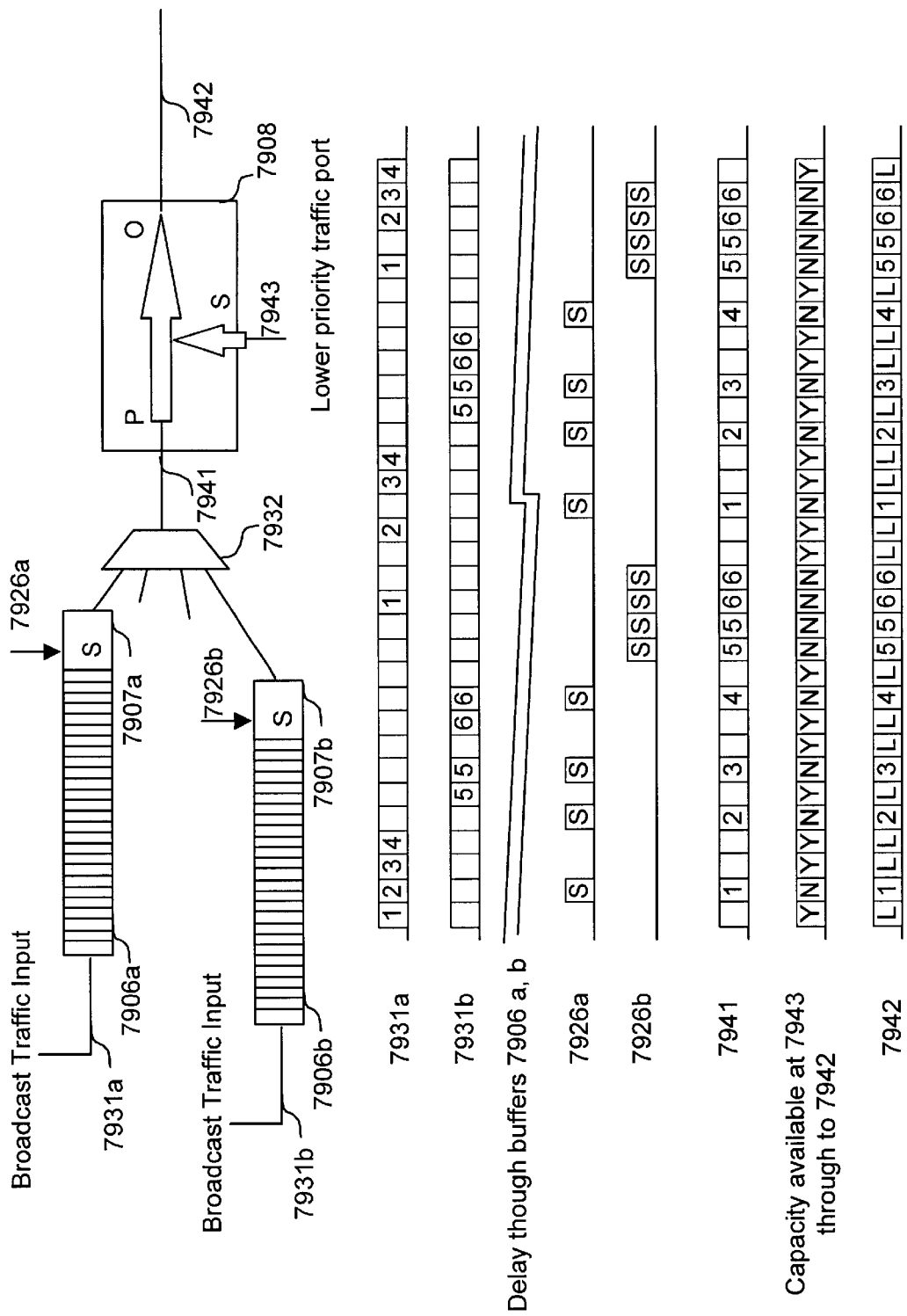
FIG. 5 shows how broadband traffic is shaped by the traffic shaper of FIG. 4.

FIG. 5 shows the detailed operation of the outlined region 7950 of FIG. 4, including two buffers 7906*a,b* accepting respective input streams 7931*a,b*, along with multiplexer 7932 producing an output stream 7941, and priority gate 7908 producing an output stream 7942. The contents of broadcast streams 7931*a,b* have been respectively identified as numbers (1,2,3,4) and (5,6) thereby to indicate corresponding broadcast services delivered in valid data cells; unused gaps spanning the duration of one cell are represented as blank cells.

Simple shapers 7907*a,b* accept bandwidth strobes 7926*a,b*, from the control processor and control the output rate of buffers 7906*a,b* connected to multiplexer 7932. The bandwidth strobes 7926*a,b* generate substantially even buffer output rates to the multiplexer 7932. The two sets of strobes are non-overlapping in time, and the residual gaps can be used by the priority gate 7908 to insert cells of lower priority (CBR) data 7943 into output data stream 7942, where the low priority data is labelled "L".

The broadcast data 7941 output as a result of the rates indicated by broadcast bandwidth strobes 7926*a,b* (and more if needed) is the highest priority type of data that can be transmitted by the fiber feeder across the PON. At each BLC, a controllable number and selection among the available broadcast channels is mapped to broadcast "bearers" which deliver the broadcast services to the individual subscribers. A services provisioning manager (SPM) in the core network usually manages the channel-to-bearer mapping associated with each BLC, which is delivered to the corresponding ONU via a downstream control channel, to be discussed later.

If the system is properly designed, one can always ensure through provisioning that the total required broadcast bandwidth across the PON never exceeds the total available bandwidth across the PON, and that the total broadcast bandwidth required by the broadcast bearers on each drop never exceeds the total available bandwidth on that drop.

However, if a subscriber wishes to access an excessive number of broadcast bearers, then congestion occurs at the copper drop without any corresponding bandwidth constriction at the HDT. For example, there may be a large number of video channels (say, 100) transmitted over the fiber link of the PON, not fully occupying the downstream fiber capacity, so that other classes of service can also be supported. A subscriber, connected to the ONU via a copper link which has a maximum capacity of, say, 20 Mbps, may try to access (watch) an excessive number of those channels simultaneously to feed multiple TV sets (e.g., 10 bearers of individual 3 Mbps channels for a total of 30 Mbps). Such an attempt would obviously overload the 20 Mbps drop and hence has to be controlled by denying the subscriber access to more BC bearers than the number of deliveries supported by the corresponding CPE drop and/or by providing a warning that incremental BC addition will preclude the delivery of a previously contracted CBR circuit. Any change in the mapping of which channels are carried across the drop by the available bearers of traffic is controlled by sending a new mapping to the ONU demultiplexer 6.

With respect to CBR traffic, the SPM and a service interface at the CPE will negotiate a data rate. (Generally, the higher the data rate, the greater the cost to the subscriber.) After agreeing to a particular rate that is to be delivered to the service interface, the SPM then discloses this rate to the control processor, which then controls the CBR buffers 7913 in FIG. 4 by supplying complementary bandwidth strobes to the simple shapers 7914. Again, the bandwidth strobes will produce an even flow of data, and the control processor need not concern itself with congestion, as the SPM was well aware of the bandwidth limitations due to broadcast traffic when negotiating the CBR bandwidth in the first place.

As for UBR traffic, each fair-share multiplexer 7919 provides an even distribution among UBR services on its corresponding drop, providing a stream of UBR traffic to the corresponding queue 7920. The control processor 66 exerts control over simple shapers 7921 in order to allocate the residual bandwidth on each drop to the UBR traffic cells in buffers 7921 after accounting for the already established BC and CBR circuits. Control of simple shapers 7921 is effected on a per-BLC (i.e., per drop) basis, to ensure, for example, that a large available residual bandwidth on the PON does not carry a large transaction (waiting in one of the buffers 7920) at a rate that cannot be handled by the subscriber's drop.

The UBR traffic on each drop passes through the fair-share multiplexer 7922, where each drop having traffic waiting to be delivered is given a fair share of the output bandwidth of the multiplexer 7922. The resultant stream is fed to the buffer 7923, which outputs cells to buffer 7925 at a rate corresponding to the residual bandwidth available on the PON, as controlled by the bandwidth strobe 7929 fed to simple shaper 7924. Alternatively, as discussed, buffer 7923 may be bypassed and the residual bandwidth on the PON can be controlled jointly with the residual bandwidth on each drop. This can be achieved by the control processor 66 calculating a bandwidth strobe for the simple shapers 7921 which would be based not only on the original (per-drop) bandwidth strobe 7928 but also on a "buffer full" signal fed from the buffer 7925 and indicating its occupancy level.

From a theoretical standpoint, the mapping of the input sequence 7933 of ATM cells to an output sequence 7934 of ATM cells by the traffic shaper must satisfy a set of inequalities comprising parameters that characterize the different bandwidth limitations in the system. Specifically, one may define:

$N_{ONU}$=number of ONUs in the PON
S=number of BC channels available on the PON
$N_{BLC}(i)$=number of BLCs on the ith ONU
$N_{BC}(i,j)$=number of BC bearers used by the jth BLC of the ith ONU
$N_{CBR}(i,j)$=number of CBR circuits established with the jth BLC of the ith ONU
$N_{UBR}(i,j)$=number of UBR services delivered to the jth BLC of the ith ONU With respect to broadcast traffic, it is important to distinguish between S and $N_{BC}(i,j)$, the former symbol representing the number of broadcast services available on the PON, e.g., the number of available television channels, whereas the latter symbol represents the number of such channels that are being accessed as bearers by BLC j of ONU i. Thus, at times when there is a substantial mass of subscribers accessing BC channels, one has $$\sum_{i,j} N_{BC}(i,j) \gg S,$$

and a significant reduction in bandwidth require for downstream transmittal across the PON is achieved. Specifically, broadcast cells from each channel being accessed by multiple subscribers are reproduced at the ONU according to the address map of the demultiplexer 6.

Turning now to the individual bandwidths, one may define:

bw(m)=bandwidth of the mth BC channel transmitted across the PON
$bw_{BC}(i,j,k)$ bandwidth of the kth BC bearer used by the jth BLC of the ith ONU
$bw_{CBR}(i,j,k)$=bandwidth of the kth CBR circuit established with the jth BLC of the ith ONU
$bw_{UBR}(i,j,k)$=bandwidth of the kth UBR service delivered to the jth BLC of the ith ONU Finally, one can represent the available downstream bandwidth on the PON by "E" (typically 600 Mbps or more) and the available downstream bandwidth across an individual twisted pair drop by "A" (typically 20 Mbps or less).

If an overload on the PON is to be averted, then the above variables must be manipulated in such a way that the sum of the bandwidths of all the services entering all the ONUs in the PON does not exceed "E", both as a long-term average or as a short-term peak, other than what can be handled by buffers (e.g., queue 85 in each BLC) used to counter multiplexing jitter. At the twisted pair drop, the bandwidth delivered to each subscriber, including all CBR, UBR and broadcast services, must not exceed "A", again both in the long term and in the short term. At the same time, and as discussed above, top priority is given to broadcast traffic, then to CBR traffic that has already been provisioned, and then to UBR traffic. Mathematically, the downstream data leaving the HDT must satisfy the following six inequalities:

$$<1> \quad T_{PON_{BC}} = \sum_{m=1}^{S} bw(m) < E$$

$$<1a> \quad T_{DROP_{BC}}(i,j) = \sum_{k=1}^{N_{BC}(i,j)} bw_{BC}(i,j,k) < A$$

$$<2> \quad T_{PON_{CBR}} = \sum_{i=1}^{N_{ONU}} \sum_{j=1}^{N_{BLC}(i)} \sum_{k=1}^{N_{CBR}(i,j)} bw_{CBR}(i,j,k) < E - T_{PON_{BC}}$$

$$<2a> \quad T_{DROP_{CBR}}(i,j) = \sum_{k=1}^{N_{CBR}(i,j)} bw_{CBR}(i,j,k) < A - T_{DROP_{BC}}(i,j)$$

$$<3> \quad \sum_{i=1}^{N_{ONU}} \sum_{j=1}^{N_{BLC}(i)} \sum_{k=1}^{N_{UBR}(i,j)} bw_{UBR}(i,j,k) < E - T_{PON_{BC}} - T_{PON_{CBR}}$$

$$<3a> \quad \sum_{k=1}^{N_{UBR}(i,j)} bw_{UBR}(i,j,k) < A - T_{DROP_{BC}}(i,j) - T_{DROP_{CBR}}(i,j)$$

where $1 \leq i \leq NONU$, $1 \leq j \leq N_{BLC}(j)$, $T_{PON_{BC}}$ is the total PON bandwidth occupied by the plurality of broadcast channels made available to all subscribers, $T_{DROP_{BC}}(i,j)$ is the total drop bandwidth occupied by the plurality of broadcast bearers being used by subscriber j on ONU i, $T_{PON_{CBR}}$ is the total PON bandwidth occupied by all CBR circuits, and $T_{DROP_{CBR}}(i,j)$ is the total drop bandwidth occupied by the plurality of CBR circuits established with subscriber j on ONU i.

As discussed, it can be ensured during service provisioning that inequality <1> will always hold, and the control processor 66 will instruct simple shapers 7907 to provide a non-overlapping, even flow of output cells.

However, because of the nature of broadcast traffic, all the broadcast channels are available to all ONUs at all times and thus control of the individual drop bandwidths $T_{DROP_{BC}}(i,j)$ cannot be achieved by adjusting parameters of the traffic shaper. Instead, satisfaction of inequality <1a> on a per drop basis requires that an upper bound be placed on the bandwidth carried by all bearers of broadcast traffic on that individual drop.

Specifically, every time a bearer is requested, the attachment of this bearer to a broadcast channel is authenticated in a central location, either by the OAM processor 57, the control processor 66, the SPM or alternatively by a separate Broadcast Control Unit (BCU, not shown). The central location processor will thus grant the request if inequality <1a> can remain satisfied. If there is very little CBR and UBR traffic on the drop, the request for a bearer is granted without consequence. However, if inequality <1a> dictates that there is a capacity for a new bearer, but the low-bandwidth (e.g., 20 Mbps) drop is busy with CBR and UBR traffic, then granting of a new bearer will require that the bandwidth used by (lower priority) CBR and UBR traffic be reduced.

Assuming therefore that inequality <1a> reveals that a new bearer of BC traffic can be allocated to the drop j on ONU i, but that the CBR and UBR traffic on this link do not leave enough room for the new BC bearer. This leads to a desired value for $T_{DROP_{BC}}(i,j)$, which is substituted into inequality <2a>. If inequality <2a> remains true, then it is possible to meet the request for a new bearer simply by reducing the UBR services delivered to the drop, without influencing the already-provisioned CBR circuits. The bandwidth strobe 7928 supplied by the control processor 66 to the one simple shaper 7921 handling UBR traffic for drop j on ONU i is made sparser to the degree required that inequality <3a> remain satisfied. The rates of the other bandwidth strobes 7928 are fractionally increased, since the total UBR bandwidth delivered across the PON remains the same (bandwidth strobe 7929 delivered to simple shaper 7924 remains unchanged) but this bandwidth is distributed among fewer contenders.

Of course, it may be the case that accommodation of the requested BC bearer is not possible solely by reduction of the UBR bandwidth, i.e., it may be impossible to satisfy inequality <2a> with the target value of $T_{DROP_{BC}}(i,j)$. In this case, one or more of the provisioned CBR services will have to be cancelled. The exact number of CBR circuits that must be abolished depends on their associated bandwidths since the requirement is the satisfaction of inequality <2a>. Since the situation in which an already existing CBR service must be cancelled is rather undesirable from the user's point of view, a message may be sent to the CPE warning the user that a new broadcast bearer is being requested, and asking the user to authorize the cancellation of one or more existing CBR services in order to activate the extra bearer.

As regards control of the traffic shaper in this case, the first step is to halt the UBR services for drop j on ONU i by throttling the simple shaper 7921 in charge of this drop via the corresponding one of the bandwidth strobes 7928. Next, the CBR circuits to be cancelled are throttled via the appropriate bandwidth strobes 7927 controlling the egress rates of simple shapers 7914. From inequality <3> it is found that the liberation of one or more CBR circuits on a given drop increases the available UBR bandwidth on the PON. Therefore, bandwidth strobe 7929 controlling simple shaper 7924 will command a higher output rate for its associated buffer 7923. Also, after inequality <3a> is solved for all other drops, and it may turn out that the UBR services on one or more drops will be able to benefit from the added PON bandwidth, thereby increasing the egress rate of those buffers 7920 not handling UBR service on drop j on ONU i.

Finally, there exists a reverse scenario, in which the number of BC bearers may be reduced by the end user, e.g., by turning off a television set. This will immediately make room for additional downstream CBR and UBR services on the drop. Although $T_{PON_{BC}}$ remains constant (dependent only on the number of available channels), a new CBR or UBR service which may indeed fit on the drop might overload the PON.

Specifically, upon termination of a BC bearer delivering downstream BC traffic across a drop, any subsequent CBR service negotiations are likely to be more successful than when the BC bearer was in use. The available CBR bandwidth on the drop is limited by the solution of inequality <2a>, whereas the set-up of a new CBR service entails an increase in the occupied PON bandwidth, which is limited by the solution of inequality <2>.

If the elimination of a bearer and the subsequent negotiation (or re-negotiation) of CBR bandwidth still leave some residual bandwidth on the PON and the drop, then UBR services can be delivered to the drop. The data rate that can be imparted to UBR traffic is therefore determined by the simultaneous solution of inequalities <2> and <3>. A change in available UBR bandwidth across the PON is reflected in the output rate of buffer 7923, controlled by simple shaper 7924 via bandwidth strobe 7929, whereas a change in UBR bandwidth used on a given drop is reflected in the output rate of the corresponding buffer 7920.

After having passed through the traffic shaper 79, the resultant sequence of ATM cells 7934 is formatted by the PON-BS 40 for transmission across the PON or other suitable transmission system that is used to interconnect the HDT to the outlying ONUs, e.g., an arrangement of point-to-point links, add-drop chains or SONET rings. Specifically, the PON-BS 40 sorts the incoming cells according to each cell's destination ONU and traffic class (both of which can be determined from the VC/VP in the cell's header), groups the sorted cells into subframes, and concatenates the subframes to form frames which are typically of duration 125 microseconds, thereby to conform to current ATM standards and emerging PON standards, and also to permit carriage of multiplexed pulse-code-modulation (PCM) voice within the access infrastructure. Thus, for each 125-microsecond frame interval, the PON-BS 40 is told by the control processor 66 how to distribute the available downstream fiber bandwidth among the various subtending ONUS. The resulting frames create a set of parallel, dynamically sizable "pipes" of data whose contents have been carefully selected so as to flow freely through the various downstream choke points.

Figure 6:
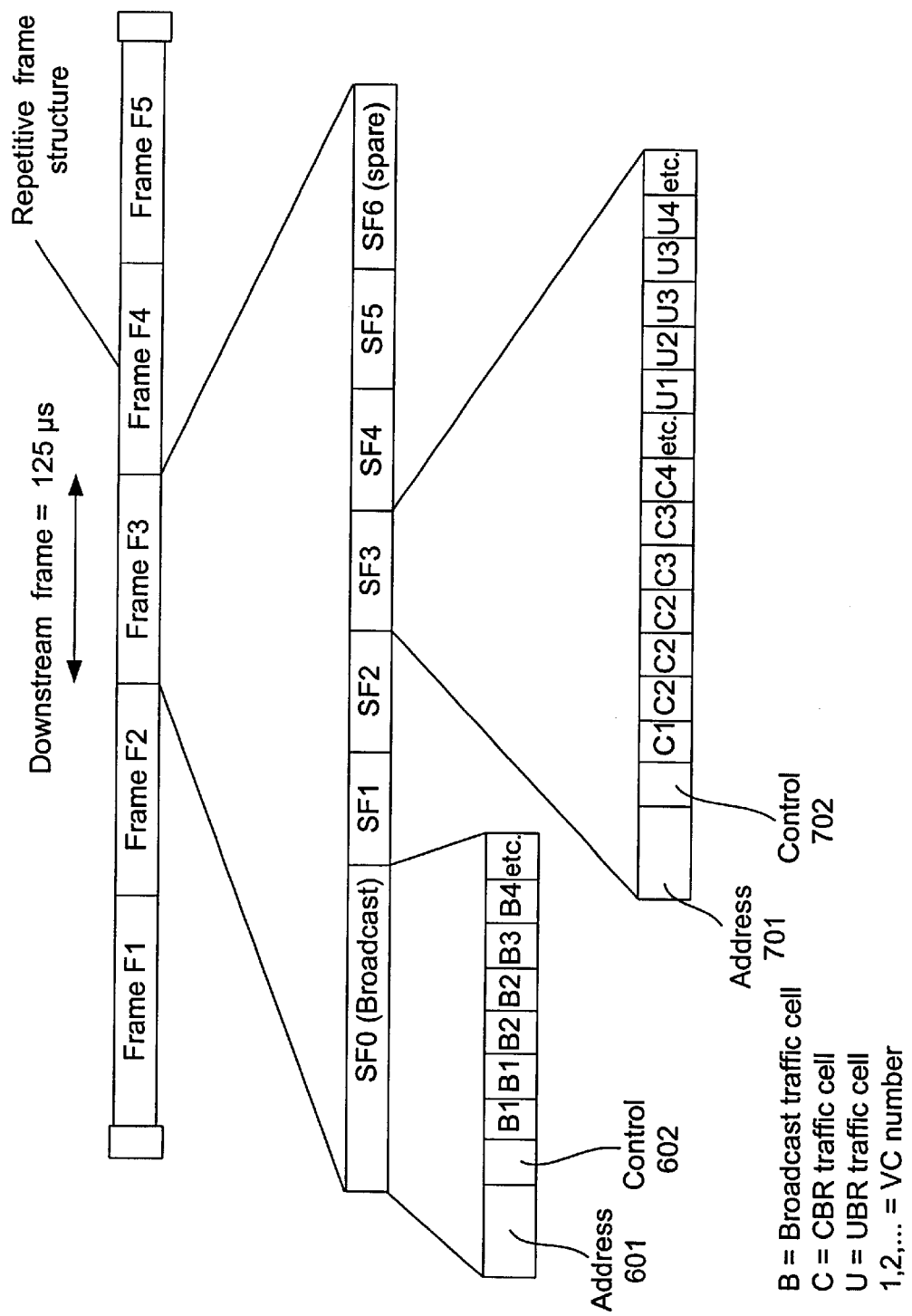
FIG. 6 depicts the downstream frame structure emitted by the PON base station in the HDT of the inventive network.

FIG. 6 illustrates a series of downstream frames F1 to F5 formed in this manner. Each frame is identical in length and is preferably divided into $N_{ONU}+2$ subframes, although the subframes need not necessarily be of the same size within the frame or across frames. By way of example, frame F3 is subdivided into seven subframes SF0 to SF6, among which subframe SF0 is a broadcast subframe, subframes SF1 to SF5 are destined for respective ONUs and subframe SF6 is a spare capacity subframe. The relative size of each subframe is determined by the overall bandwidth requirement for broadcast traffic and the relative bandwidth demands of each individual ONU.

For purposes of identifiability, traffic cells forming part of frame F3 in FIG. 6 have each been given a letter (corresponding to the traffic class) and a number (corresponding to the VC or VP). The broadcast traffic cells carrying channels B1,B2, . . . have been grouped into broadcast subframe SF0, to which is also appended an address channel 601 and a control channel 602. The address and control channels 601,602 establish the downstream control link between the HDT and the subtending ONUs. It is to be understood that the address and control channels may themselves be ATM cells which identify (in their respective headers) the destination ONUs, or a specific component in the destination ONUs. In the case of broadcast subframe SF0, the address and control channels 601,602 can optionally identify all ONUs on the PON as destination ONUs.

Subframes SF1 to SF5 each comprise traffic cells carrying CBR and UBR traffic hich are destined for a single ONU. Subframe SF3 has been expanded to show traffic cells carrying CBR circuits C1,C2, . . . and UBR services U1,U2, . . . Again, there is shown the preferable arrangement of an ONU address and synchronization channel 701 (indicating the destination ONU), as well as an ONU control channel 702.

Although the above frame subdivision is preferred and requires that each subtending ONU read only two subframes, SF0 and the one destined for that ONU, it is to be understood that there exist many variations of the above technique. For example, the subframes themselves may comprise an unused portion that represents spare downstream capacity on the PON. This may be used in conjunction with, or as a replacement for, the spare capacity subframe SF6 shown in FIG. 6. Moreover, the control information for each subframe may be grouped together in a separate subframe which is destined for all downstream ONUs.

Another variation consists of eliminating the broadcast subframe SF0 and inserting a fraction of the broadcast cells in each subframe. This "embedded broadcast" approach requires that each subtending ONU read all the subframes, extracting all the cells from one subframe and only the broadcast cells from all the other subframes.

It is also within the scope of the present invention to provide methods of effectively employing the available PON bandwidth bandwidth different from the synchronous time-division multiplexing (TDM) technique outlined above. For example, the transmission of downstream and upstream data may occur in alternating bursts, the duty cycle of which determines the percentage of available bandwidth that is used in each direction.

Figure 7:
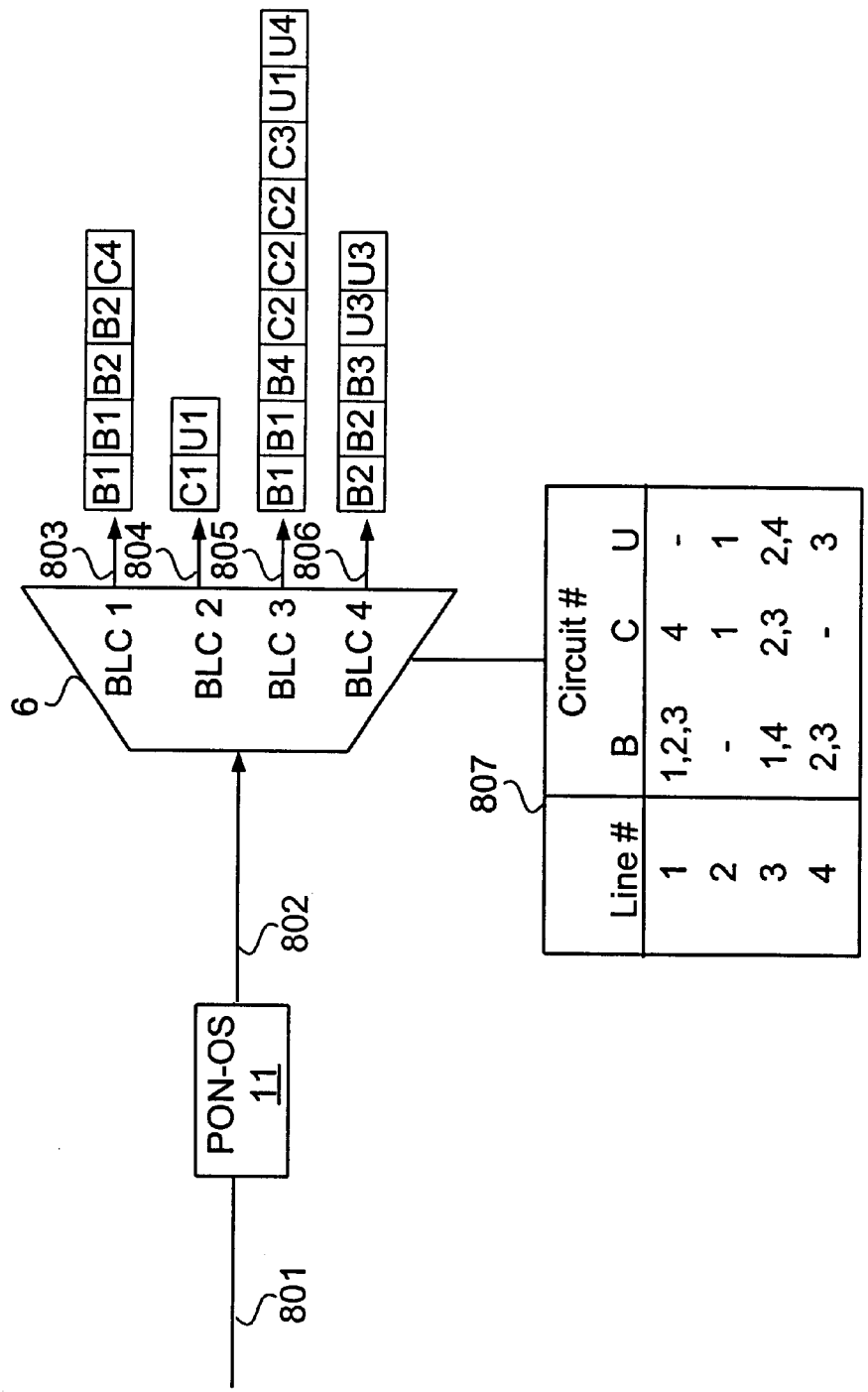
FIG. 7 illustrates the operation of the ONU demultiplexer given an example service and traffic mix.

Reference is now made to FIG. 7, which serves to illustrate an example mode of operation of the downstream PON-OS 11 and demultiplexer 6 at the ONU. From an incoming stream 801 of frames, the downstream PON-OS 11 reads the ONU address channel of each subframe. If the subframe is a broadcast subframe, then the all cells in the subframe are sent to the demultiplexer 6. If the subframe is not a broadcast subframe but is destined for that ONU, then its cells are sent to the multiplexer 6; otherwise its contents are ignored. Therefore, the demultiplexer 6 receives an intermittent stream 802 of ATM cells. Information in the control channels of the two accepted subframes is fed to the ONU control processor (76 in FIG. 3).

The demultiplexer 6 receives the intermittent cells and outputs streams 803–806 of ATM cells destined for respective line cards according to a mapping that is supplied by the ONU control processor based on information in the downstream control channel of the broadcast and non-broadcast subframes.

A routing table 807 that associates each combination of virtual circuit and traffic class to a specific line card is contained in the demultiplexer 6. This mapping depends on the bandwidth requirements and service requests of the end user and therefore changes with time. (For example, this mapping determines the broadcast channels carried by broadcast bearers to a particular subscriber, as discussed earlier.) The mapping 807 can be updated by supplying appropriate mapping instructions from the control processor 66 via the control channel of the subframes to the ONU control processor 76. An example mapping 807 is shown in FIG. 7:

| | |
|---|---|
| B1, B2, B3, C4 | routed to BLC 1 |
| C1 and U1 | routed to BLC 2 |
| B1, B4, C2, C3, U2, U4 | routed to BLC 3 |
| B2, B3, U3 | routed to BLC 4. |

It is important to note that, in general, broadcast cells are routed to more than one ONU and, within each ONU, are often routed to more than one one line card. According to the above mapping, broadcast cells B1, B2 and B3 are to be routed to more than one BLC, which requires cell replication at the demultiplexer 6.

Considering now each BLC 60, the queue 85 accepting a stream of ATM cells need accommodate enough cells to account for multiplexing jitter. This phenomenon is a consequence of the nature of the transmission process, rather than having to do with the characteristics of the transmitted traffic. Specifically, multiplexing jitter arises when cells arrive at the queue in bursts during which data arrives at a peak bit rate but the arriving cells leave the queue at a substantially continuous, but lower bit rate. In the inventive system, due to the forward-looking intelligence of the traffic shaper, only enough cells that can be emptied during one frame will ever be sent towards the queue. Therefore, the queues 85 are relatively small compared to those in prior art systems.

In an example situation, the number of cells that can be delivered to a single customer during one frame is 25 Mbps*125 $\mu$s=3125 bits. (At a peak rate of 600 Mbps, this corresponds to a "fill time" of 5.2 $\mu$s.) The downstream queue 85 on each line card must therefore have the ability to store 3125 bits, or approximately 8 ATM cells with 53*8= 424 bits each. This amount of memory is small enough not to have an impact in terms of ONU size, power consumption and failure rate, and is therefore a significant improvement over the prior art. Moreover, the size of the queue is independent of the characteristics of the throughput traffic such as the size of a requested file transfer or transaction.

After passing through the downstream queue 85, the data headed towards the CPE 99 enters the modem 22 and travels a path identical to that described when discussing the prior art system. The downstream PON-OS 11 and ONU control processor 76 may communicate with the CPE 99 using specially addressed ATM cells, via dedicated links, or using particular modulating techniques.

Detailed Description of Upstream Operation of the Preferred Embodiment

Figure 8:
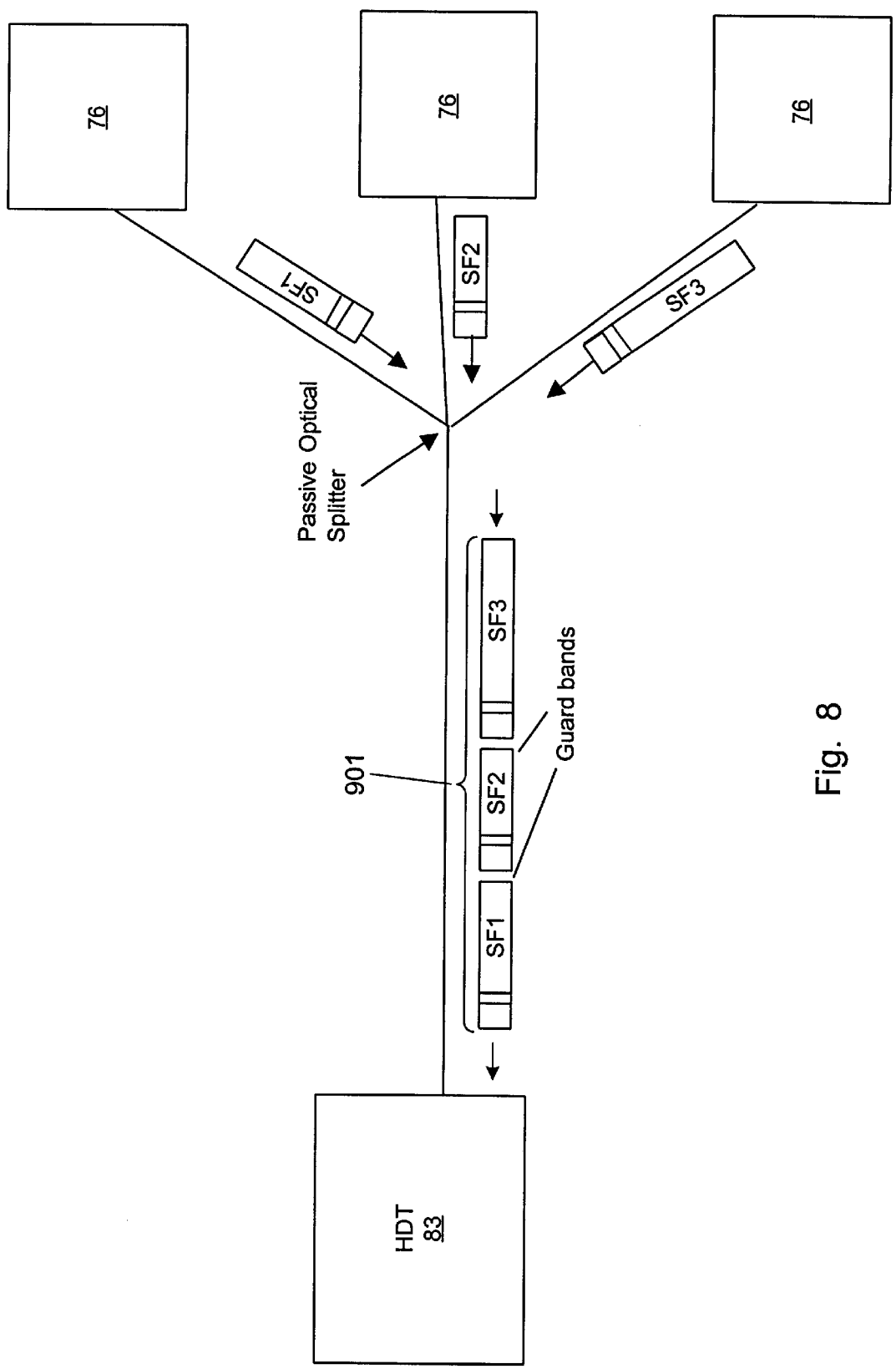
FIG. 8 shows how upstream bursts are transmitted by the ONU multiplexer.

Operation of the inventive system in the upstream direction is now described with reference to FIGS. 3 and 8. ATM cells arriving in an analog format from the CPE 99 are delivered to the queue 77 in digital format in one of many known ways via the hybrid 19, the receiver 35 and the digital modem 33. The queue 77 feeds an output stream 74 of ATM cells into the ONU multiplexer 7.

The upstream cells are multiplexed as they arrive at the multiplexer 7 and are fed through another buffer 72 to the upstream PON-OS 9. The upstream PON-OS 9 assembles a group of upstream cells into a subframe, and waits for a synchronization signal from the ONU control processor 76 prior to upstream transmission. The actual number of cells in a subframe, as well as the timing information is derived from the information contained in the control channel in the downstream subframes.

It is preferably the PON-BS 40 in the HDT that executes a marshalling algorithm (according to ITU draft specification I.983, for example), which coordinates upstream transmission of individual subframes by the upstream PON-OS 9 in each of the ONUs. The resultant sequence of subframes is shown in FIG. 8 as forming a "train" 901 of subframes separated by guard bands which contain no valid data.

Upon arrival of the slightly "gapped" train of subframes at the HDT, the appropriate transceiver 39 converts the optical signal into an electronic one. The PON-BS 40 ignores the guard bands, strips the control and address information from the subframes and produces a stream of ATM cells travelling towards the ATM switch matrix 44. If the switch matrix 44 is lightly loaded, then the data is immediately routed by the switch matrix 44 towards its destination in the core network.

An important scenario to consider is that of an ONU that has been allocated a fixed upstream data rate, i.e., the number of cells in its upstream subframe is limited. In the event that a new service interface on that ONU wishes to transmit upstream data, at least one BLC in the ONU may actually be attempting to transmit data at a higher rate than that which is available to the ONU. It is clear that a certain amount of traffic shaping is necessary to reallocate the upstream bandwidth on the PON, and this can be done without introducing any new hardware.

One method of providing the necessary upstream traffic shaping is for each queue control block 78 to be interrupted when the upstream queues 72,77 are filling at a higher rate than usual, and subsequently to request additional upstream PON bandwidth for its ONU by submitting such request to the PON-BS 40 in the HDT, which further relays these demands to the control processor 66 (or to the separate traffic shaping processor).

The processor responsible for the upstream traffic shaping evaluates whether the requests can be met by applying a series of inequalities similar to <1> to <3a> above, but with upstream parameters. In many cases, the processor will allow the granting of an increased quantity of bandwidth, but which is less than that requested. If the new amount of bandwidth is indeed inferior to the requested amount, then the control processor signals to certain ones of the CPEs (via the downstream control channels and appropriate BLCs) that bandwidth throttling is required in the CPE, i.e., that the data rate of upstream UBR circuits is to be reduced at the source.

Since the control processor 66 has visibility into the bandwidth usage across the entire PON, it may also recognize that certain ONUs or BLCs are not using their full upstream bandwidth, and may increase the number of cells in the upstream subframes associated with the busier ONUs. The control processor 66 will make this information available to the higher layers of the core network 51.

In the meantime, until the ONU receives the additional bandwidth, even if it is the full requested amount, buffer 72 in the ONU and buffers 77 in the overly demanding BLCs will continue to fill at a rate equal to the difference between the requested upstream capacity and the summation of the upstream capacities of the BLCs. The delay incurred due to the bandwidth reallocation procedure is a controllable design parameter of the ONU transmission path and HDT control processor 66, comprising the summation of the delays through these components. Practical designs can be realized with a total delay of approximately 2 to 5 milliseconds. In a worst-case scenario, i.e., a 5 millisecond delay, each line card instantaneously requesting 2 Mbps from an initial idle condition would require the storage of 10,000 bits (equal to 1.2 kilobytes, or approximately 25 ATM cells) in its upstream path. In combination, the ONU queue 72 and the individual BLC queues 77 are therefore required to provide storage capacity of 1.2 kilobytes per line card. Optionally, the queues 77 can be dispensed with if there is enough storage capacity in the upstream ONU queue 72 to handle about a kilobyte of data per attached line card.

From the above discussions of the inventive access system, it is evident that traffic is controlled primarily in order to reduce the memory requirements of the ONUs. This leads to smaller, less power-hungry, and ultimately cheaper units to be installed in the field. The majority of the system memory is thus concentrated in a centralized environment, that is to say, in a traffic shaper at the HDT, which not only requires less total memory, but also facilitates maintenance and replacement in case of failure.

While the preferred embodiment of the invention has been described and illustrated, it will be apparent to one skilled in the art that variations in the design can be made. The scope of the invention, therefore, is only to be limited by the claims appended hereto.

We claim:

1. A method of downstream data transmission for use in an access system comprising a host digital terminal (HDT) connected by optical fiber to a plurality of optical network units (ONUs), each ONU being connected to a respective plurality of subscribers by a respective plurality of subscriber drops, the method comprising:

determining which drops from among the subscriber drops the downstream data is destined for, said drops being destination drops;

determining the downstream bandwidth available on the fiber and on the destination drops; and transmitting the downstream data only if there is sufficient downstream bandwidth on the fiber and on the destination drops.

2. A method of transmitting upstream data, for use in an access system comprising a host digital terminal (HDT) connected by optical fiber to a plurality of optical network units (ONUs), each ONU being connected to a respective plurality of subscribers by a respective plurality of subscriber drops, the method comprising:

determining which drops from among the subscriber drops intend to transmit upstream data, said drops being source drops;

determining the upstream bandwidth available on the fiber and on the source drops; and allowing the transmittal of upstream data only if there is sufficient upstream bandwidth on the fiber and on the source drops.

3. A method of transmitting data from a host digital terminal (HDT) to at least one optical network unit (ONU), each ONU being connected to the HDT by optical fiber and to a respective plurality of subscribers by a respective plurality of subscriber drops, wherein the data can be transmitted across the fiber at a maximum fiber data rate and across each drop at a respective maximum drop data rate, wherein the data is requested to be transmitted across the fiber at a requested fiber data rate and across each drop at a respective requested drop data rate, the data being a mixture of high-priority data and low-priority data, the method comprising the steps of:

the HDT determining which of said downstream data is high-priority data and which of said downstream data is low-priority data;

if the requested fiber data rate is less than or equal to the maximum fiber data rate and if the requested drop data rate is less than or equal to the maximum drop data rate, the HDT transmitting all of said downstream data;

otherwise, the HDT transmitting all of said high-priority data and only part of said low-priority data, and temporarily storing the remaining low-priority data.

4. A method of mapping an input sequence of traffic cells to an output sequence of traffic cells for transmission by a host digital terminal (HDT) to at least one optical network unit (ONU), each ONU being connected by optical fiber to the HDT and by a respective plurality of subscriber drops to a respective plurality of subscribers, each traffic cell being associated with either high-priority or low-priority traffic and with a destination drop from among the subscriber drops, wherein data can be transmitted across the fiber at a maximum fiber data rate, wherein data can be transmitted across each subscriber drop at a respective maximum drop data rate, the method comprising the steps of:

determining the traffic priority and destination drop associated with each cell in the input sequence;

separating the cells in the input sequence according to the traffic priority and destination drop associated with each cell, thereby to produce a plurality of demultiplexed cell streams;

temporarily storing the plurality of demultiplexed cell streams in a respective plurality of buffers and releasing the cells in each buffer according to respective controllable output data rates; and combining the cells released by the plurality of buffers, thereby to form the output sequence;

wherein the total output data rate of all buffers containing high-priority traffic cells is controlled to be less than or equal to the maximum fiber data rate;

wherein the total output data rate of all buffers containing high-priority traffic cells associated with a common destination drop is controlled to be less than or equal to the maximum drop data rate for that destination drop;

wherein the total output data rate of all buffers containing low-priority traffic cells is controlled to be less than or equal to the maximum fiber data rate minus the total output data rate of all buffers containing high-priority traffic cells; and wherein the total output data rate of all buffers containing low-priority traffic cells associated with a common destination drop is controlled to be less than or equal to the maximum drop data rate for that destination drop minus the total output data rate of all buffers containing high-priority traffic cells associated with that destination drop.

5. A method according to claim 4, wherein the traffic cells are asynchronous transfer mode (ATM) cells each having a header, wherein the traffic priority associated with a traffic cell is encoded in the header of said cell, wherein the destination drop associated with a high-priority or low-priority traffic cell is encoded in the header of said high-priority or low-priority traffic cell.

6. A method according to claim 4, wherein the total output data rate of all buffers containing low-priority traffic cells associated with a common destination drop is distributed substantially equally among said buffers.

7. A method of mapping an input sequence of traffic cells to an output sequence of traffic cells for transmission by a host digital terminal (HDT) to at least one optical network unit (ONU), each ONU being connected by optical fiber to the HDT and by a respective plurality of subscriber drops to a respective plurality of subscribers, each traffic cell being associated with either broadcast-priority, high-priority or low-priority traffic, each high-priority or low-priority traffic cell being associated with a destination drop from among the subscriber drops, each broadcast-priority cell being further associated with a broadcast channel, wherein each subscriber drop is associated with a controllable number of broadcast channels, wherein data can be transmitted across the fiber at a maximum fiber data rate, wherein data can be transmitted across each subscriber drop at a respective maximum drop data rate, the method comprising the steps of:

determining the traffic priority and destination drop or broadcast channel associated with each cell in the input sequence;

separating the cells in the input sequence according to the traffic priority and destination drop or broadcast channel associated with each cell, thereby to produce a plurality of demultiplexed cell streams;

temporarily storing the plurality of demultiplexed cell streams in a respective plurality of buffers and releasing the cells in each buffer according to respective controllable output data rates; and combining the cells released by the plurality of buffers, thereby to form the output sequence;

wherein the total output data rate of all buffers containing broadcast-priority traffic cells is controlled to be less than or equal to the maximum fiber data rate;

wherein the number of broadcast channels associated with each subscriber drop is controlled such that the total output data rate of all buffers containing broadcast-priority traffic cells associated with the broadcast channels associated with said subscriber drop is less than or equal to the maximum drop data rate;

wherein the total output data rate of all buffers containing high-priority traffic cells is less than or equal to the maximum fiber data rate minus the total output data rate of all buffers containing broadcast-priority traffic;

wherein the total output data rate of all buffers containing high-priority traffic cells associated with a common destination drop is less than or equal to the maximum drop data rate for that destination drop minus the total output data rate of all buffers containing broadcast-priority traffic cells associated with the broadcast channels associated with that destination drop;

wherein the total output data rate of all buffers containing low-priority traffic cells is less than or equal to the maximum fiber data rate minus the sum of the total output data rate of all buffers containing high-priority traffic cells and the total output data rate of all buffers containing broadcast-priority traffic cells; and wherein the total output data rate of all buffers containing low-priority traffic cells associated with a common destination drop is less than or equal to the maximum drop data rate for that destination drop minus the sum of the total output data rate of all buffers containing high-priority traffic cells associated with that destination drop and the total output data rate of all buffers containing broadcast-priority traffic cells associated with the broadcast channels associated with that destination drop.

8. A method according to claim 7, wherein the traffic cells are asynchronous transfer mode (ATM) cells each having a header, wherein the traffic priority associated with a traffic cell is encoded in the header of said cell, wherein the destination drop associated with a high-priority or low-priority traffic cell is encoded in the header of said high-priority or low-priority traffic cell, wherein the broadcast channel associated with a broadcast-priority traffic cell is encoded in the header of said broadcast-priority traffic cell.

9. A method according to claim 7, wherein the total output data rate of all buffers containing low-priority traffic cells associated with a common destination drop is distributed substantially equally among said buffers.

10. In an access system comprising a host digital terminal (HDT) connected by optical fiber to a plurality of optical network units (ONUs), each ONU being connected to a respective plurality of subscribers by a respective plurality of subscriber drops, a traffic shaper for transmitting an output stream of traffic cells from the HDT to the subscribers, the traffic shaper comprising:

control means for determining the bandwidth available on the fiber and on the subscriber drops; and remapping means for controllably reordering and releasing an input stream of traffic cells in accordance with the bandwidth available on the fiber and on the subscriber drops, thereby to form the output stream of traffic cells.

11. A traffic shaper according to claim 10, wherein the control means is a control processor, and wherein the remapping means comprises a random access memory (RAM) for temporarily storing the traffic cells in the input stream and retrieving the traffic cells in an order and at a rate controlled by the control processor.

12. A traffic shaper according to claim 10, wherein the traffic cells are asynchronous transfer mode (ATM) cells.

13. A traffic shaper according to claim 10, wherein each traffic cell is associated with either high-priority or low-priority traffic, wherein the control means is a control processor, and wherein the remapping means comprises:

means for separating traffic cells in the input stream of traffic cells according to traffic priority, thereby to produce a stream of high-priority traffic cells and a stream of low-priority traffic cells;

means for controllably reordering and releasing the traffic cells in the stream of high-priority traffic cells, thereby to produce an ordered stream of high-priority traffic cells;

means for controllably reordering and releasing the traffic cells in the stream of low-priority traffic cells, thereby to produce an ordered stream of low-priority traffic cells; and means for combining the ordered stream of high-priority traffic cells and the ordered stream of low-priority traffic cells, thereby to produce the output stream of traffic cells.

14. A traffic shaper according to claim 13, wherein the traffic cells are asynchronous transfer mode (ATM) cells each having a header, wherein the traffic priority associated with a traffic cell is encoded in the header of said cell.

15. A traffic shaper according to claim 10, wherein each traffic cell is associated with either high-priority or low-priority traffic and with a destination drop from among the subscriber drops, wherein the control means is a control processor, and wherein the remapping means comprises:

means for separating traffic cells in the input stream of traffic cells according to traffic priority, thereby to produce a stream of high-priority traffic cells and a stream of low-priority traffic cells;

means for separating the traffic cells in the stream of high-priority traffic cells according to destination drop, thereby to produce a plurality of drop-specific streams of high-priority traffic cells;

a first plurality of buffers for temporarily storing and controllably releasing the plurality of drop-specific streams of high-priority traffic cells, thereby to produce a respective plurality of paced drop-specific streams of high-priority traffic cells;

means for combining the paced drop-specific streams of high-priority traffic cells, thereby to produce an ordered stream of high-priority traffic cells;

means for separating the traffic cells in the stream of low-priority traffic cells according to destination drop, thereby to produce a plurality of drop-specific streams of low-priority traffic cells;

a second plurality of buffers for temporarily storing and controllably releasing the plurality of drop-specific streams of low-priority traffic cells, thereby to produce a respective plurality of paced drop-specific streams of low-priority traffic cells;

means for combining the paced drop-specific streams of low-priority traffic cells, thereby to produce an ordered stream of low-priority traffic cells;

means for combining the ordered stream of high-priority traffic cells with the ordered stream of low-priority traffic cells, thereby to produce the output stream of traffic cells.

16. A traffic shaper according to claim 15, wherein the traffic cells are asynchronous transfer mode (ATM) cells each having a header, wherein the traffic priority associated with a traffic cell is encoded in the header of said cell, wherein the destination drop associated with a high-priority or low-priority traffic cell is encoded in the header of said high-priority or low-priority traffic cell.

17. A traffic shaper according to claim 15, wherein the total output data rate of all buffers containing low-priority traffic cells associated with a common destination drop is distributed substantially equally among said buffers.

18. A traffic shaper according to claim 10, wherein each traffic cell is associated with one of broadcast-priority, high-priority or low-priority traffic, wherein the control means is a control processor, and wherein the remapping means comprises:

means for separating traffic cells in the input stream of traffic cells according to priority, thereby to produce a stream of broadcast-priority traffic cells, a stream of high-priority traffic cells and a stream of low-priority traffic cells;

means for controllably reordering and releasing the traffic cells in the stream of broadcast-priority traffic cells, thereby to produce an ordered stream of broadcast-priority traffic cells;

means for controllably reordering and releasing the traffic cells in the stream of high-priority traffic cells, thereby to produce an ordered stream of high-priority traffic cells;

means for controllably reordering and releasing the traffic cells in the stream of low-priority traffic cells, thereby to produce an ordered stream of low-priority traffic cells; and means for combining the ordered stream of broadcast-priority traffic cells, the ordered stream of high-priority traffic cells and the ordered stream of low-priority traffic cells, thereby to produce the output stream of traffic cells.

19. A traffic shaper according to claim 18, wherein the traffic cells are asynchronous transfer mode (ATM) cells each having a header, wherein the traffic priority associated with a traffic cell is encoded in the header of said cell.

20. A traffic shaper according to claim 10, wherein each traffic cell is associated with one of broadcast-priority, high-priority or low-priority traffic, wherein each high-priority or low-priority traffic cell is further associated with a destination drop from among the subscriber drops, wherein each broadcast-priority cell is further associated with a broadcast channel, wherein each subscriber drop is associated with a controllable number of broadcast channels, wherein the control means controls the broadcast channels associated with each subscriber drop, wherein the control means is a control processor, and wherein the remapping means comprises:

means for separating traffic cells in the input stream of traffic cells according to priority, thereby to produce a stream of broadcast-priority traffic cells, a stream of high-priority traffic cells and a stream of low-priority traffic cells;

means for separating the traffic cells in the stream of broadcast-priority traffic cells according to broadcast channel, thereby to produce a plurality of channel-specific streams of broadcast-priority traffic cells;

a first plurality of buffers for temporarily storing and controllably releasing the plurality of channel-specific streams of broadcast-priority traffic cells, thereby to produce a respective plurality of paced channel-specific streams of broadcast-priority traffic cells;

means for combining the paced channel-specific streams of broadcast-priority traffic cells, thereby to produce an ordered stream of broadcast-priority traffic cells;

means for separating the traffic cells in the stream of high-priority traffic cells according to destination drop, thereby to produce a plurality of drop-specific streams of high-priority traffic cells;

a second plurality of buffers for temporarily storing and controllably releasing the plurality of drop-specific streams of high-priority traffic cells, thereby to produce a respective plurality of paced drop-specific streams of high-priority traffic cells;

means for combining the paced drop-specific streams of high-priority traffic cells, thereby to produce an ordered stream of high-priority traffic cells;

means for separating the traffic cells in the stream of low-priority traffic cells according to destination drop, thereby to produce a plurality of drop-specific streams of low-priority traffic cells;

a third plurality of buffers for temporarily storing and controllably releasing the plurality of drop-specific streams of low-priority traffic cells, thereby to produce a respective plurality of paced drop-specific streams of low-priority traffic cells;

means for combining the paced drop-specific streams of low-priority traffic cells, thereby to produce an ordered stream of low-priority traffic cells; and means for combining the ordered stream of broadcast-priority traffic cells, the ordered stream of high-priority traffic cells and the ordered stream of low-priority traffic cells, thereby to produce the output stream of traffic cells.

21. A traffic shaper according to claim 20, wherein the traffic cells are asynchronous transfer mode (ATM) cells each having a header, wherein the traffic priority associated with a traffic cell is encoded in the header of said cell, wherein the destination drop associated with a high-priority or low-priority traffic cell is encoded in the header of said high-priority or low-priority traffic cell, wherein the broadcast channel associated with a broadcast-priority traffic cell is encoded in the header of said broadcast-priority traffic cell.

22. A traffic shaper according to claim 20, wherein the total output data rate of all buffers containing low-priority traffic cells associated with a common destination drop is distributed substantially equally among said buffers.

23. A traffic shaper according to claim 10, wherein each traffic cell is associated with one of broadcast-priority, high-priority or low-priority traffic, wherein each low-priority traffic cell is further associated with a destination drop from among the subscriber drops and with a service being delivered to that destination drop, wherein multiple services can be associated with an identical destination drop, wherein each high-priority traffic cell is further associated with a destination drop from among the subscriber drops, wherein each broadcast-priority cell is further associated with a broadcast channel, wherein each subscriber drop is associated with a controllable number of broadcast channels, wherein the control means controls the broadcast channels associated with each subscriber drop, wherein the control means is a control processor, and wherein the remapping means comprises:

means for separating traffic cells in the input stream of traffic cells according to priority, thereby to produce a stream of broadcast-priority traffic cells, a stream of high-priority traffic cells and a stream of low-priority traffic cells;

means for separating the traffic cells in the stream of broadcast-priority traffic cells according to broadcast channel, thereby to produce a plurality of channel-specific streams of broadcast-priority traffic cells;

a first plurality of buffers for temporarily storing and controllably releasing the plurality of channel-specific streams of broadcast-priority traffic cells, thereby to produce a respective plurality of paced channel-specific streams of broadcast-priority traffic cells;

means for combining the paced channel-specific streams of broadcast-priority traffic cells, thereby to produce an ordered stream of broadcast-priority traffic cells;

means for separating the traffic cells in the stream of high-priority traffic cells according to destination drop, thereby to produce a plurality of drop-specific streams of high-priority traffic cells;

a second plurality of buffers for temporarily storing and controllably releasing the plurality of drop-specific streams of high-priority traffic cells, thereby to produce a respective plurality of paced drop-specific streams of high-priority traffic cells;

means for combining the paced drop-specific streams of high-priority traffic cells, thereby to produce an ordered stream of high-priority traffic cells;

means for separating the traffic cells in the stream of low-priority traffic cells according to service and destination drop, thereby to produce a plurality of individual streams of low-priority traffic cells;

a third plurality of buffers for temporarily storing and making available the plurality of individual streams of low-priority traffic cells, thereby to produce a respective plurality of delayed service-specific streams of low-priority traffic cells;

means for combining the delayed individual streams of low-priority traffic cells according to destination drop, thereby to produce a plurality of drop-specific streams of low-priority traffic cells;

means for temporarily storing and controllably releasing the plurality of drop-specific streams of low-priority traffic cells, thereby to produce a plurality of paced drop-specific streams of low-priority traffic cells;

means for combining the paced drop-specific streams of low-priority traffic cells, thereby to produce an ordered stream of low-priority traffic cells;

means for temporarily storing and controllably releasing the ordered streams of low-priority traffic cells, thereby to produce a paced and ordered stream of low-priority traffic cells;

means for combining the ordered stream of broadcast-priority traffic cells, the ordered stream of high-priority traffic cells and the paced and ordered stream of low-priority traffic cells, thereby to produce the output stream of traffic cells.

24. A host digital terminal, comprising:

a first plurality of optoelectronic converters for exchanging upstream and downstream traffic cells with a core network via optical fiber;

a digital switch matrix connected to the first plurality of optoelectronic converters, for routing the upstream and downstream traffic cells to and from the core network in accordance with a controllable routing map;

an HDT control processor connected to the digital switch matrix for controlling the routing map of the digital switch matrix;

a plurality of base stations for formatting the downstream traffic cells into downstream subframes comprising a control channel containing control information and a traffic channel containing the downstream traffic cells, and for formatting upstream subframes received from the ONUs into upstream traffic cells;

a second plurality of optoelectronic converters for exchanging subframes with the ONUs; and a traffic shaper connected between the digital switch matrix and the second plurality of optoelectronic converters, for controlling the transmission of downstream traffic cells, the traffic shaper comprising control means for determining the bandwidth available on the fiber and on the subscriber drops, and remapping means for controllably reordering and releasing an input stream of downstream traffic cells received from the digital switch matrix in accordance with the bandwidth available on the fiber and on the subscriber drops, thereby to form an output stream of downstream traffic cells delivered to a corresponding one of the second plurality of base stations.

25. An HDT according to claim 24, wherein the control means is a traffic shaping control processor, and wherein the remapping means comprises a random access memory (RAM) for temporarily storing the traffic cells in the input stream and retrieving the traffic cells in an order and at a rate controlled by the traffic shaping control processor.

26. An HDT according to claim 24, wherein each traffic cell is associated with either high-priority or low-priority traffic, wherein the control means is a traffic shaping control processor, and wherein the remapping means comprises:

means for separating traffic cells in the input stream according to traffic priority, thereby to produce a stream of high-priority traffic cells and a stream of low-priority traffic cells;

means for controllably reordering and releasing the traffic cells in the stream of high-priority traffic cells, thereby to produce an ordered stream of high-priority traffic cells;

means for controllably reordering and releasing the traffic cells in the stream of low-priority traffic cells, thereby to produce an ordered stream of low-priority traffic cells; and means for combining the ordered stream of high-priority traffic cells and the ordered stream of low-priority traffic cells, thereby to produce the output stream.

27. An HDT according to claim 24, wherein each traffic cell is associated with either high-priority or low-priority traffic and with a destination drop from among the subscriber drops, wherein the control means is a traffic shaping control processor, and wherein the remapping means comprises:

means for separating traffic cells in the input stream according to traffic priority, thereby to produce a stream of high-priority traffic cells and a stream of low-priority traffic cells;

means for separating the traffic cells in the stream of high-priority traffic cells according to destination drop, thereby to produce a plurality of drop-specific streams of high-priority traffic cells;

a first plurality of buffers for temporarily storing and controllably releasing the plurality of drop-specific streams of high-priority traffic cells, thereby to produce a respective plurality of paced drop-specific streams of high-priority traffic cells;

means for combining the paced drop-specific streams of high-priority traffic cells, thereby to produce an ordered stream of high-priority traffic cells;

means for separating the traffic cells in the stream of low-priority traffic cells according to destination drop, thereby to produce a plurality of drop-specific streams of low-priority traffic cells;

a second plurality of buffers for temporarily storing and controllably releasing the plurality of drop-specific streams of low-priority traffic cells, thereby to produce a respective plurality of paced drop-specific streams of low-priority traffic cells;

means for combining the paced drop-specific streams of low-priority traffic cells, thereby to produce an ordered stream of low-priority traffic cells;

means for combining the ordered stream of high-priority traffic cells with the ordered stream of low-priority traffic cells, thereby to produce the output stream.

28. An HDT according to claim 24, wherein each traffic cell is associated with one of broadcast-priority, high-priority or low-priority traffic, wherein the control means is a traffic shaping control processor, and wherein the remapping means comprises:

means for separating traffic cells in the input stream according to priority, thereby to produce a stream of broadcast-priority traffic cells, a stream of high-priority traffic cells and a stream of low-priority traffic cells;

means for controllably reordering and releasing the traffic cells in the stream of broadcast-priority traffic cells, thereby to produce an ordered stream of broadcast-priority traffic cells;

means for controllably reordering and releasing the traffic cells in the stream of high-priority traffic cells, thereby to produce an ordered stream of high-priority traffic cells;

means for controllably reordering and releasing the traffic cells in the stream of low-priority traffic cells, thereby to produce an ordered stream of low-priority traffic cells; and means for combining the ordered stream of broadcast-priority traffic cells, the ordered stream of high-priority traffic cells and the ordered stream of low-priority traffic cells, thereby to produce the output stream.

29. An HDT according to claim 24, wherein each traffic cell is associated with one of broadcast-priority, high-priority or low-priority traffic, wherein each high-priority or low-priority traffic cell is further associated with a destination drop from among the subscriber drops, wherein each broadcast-priority cell is further associated with a broadcast channel, wherein each subscriber drop is associated with a controllable number of broadcast channels, wherein the control means controls the broadcast channels associated with each subscriber drop, wherein the control means is a traffic shaping control processor, and wherein the remapping means comprises:

means for separating traffic cells in the input stream according to priority, thereby to produce a stream of broadcast-priority traffic cells, a stream of high-priority traffic cells and a stream of low-priority traffic cells;

means for separating the traffic cells in the stream of broadcast-priority traffic cells according to broadcast channel, thereby to produce a plurality of channel-specific streams of broadcast-priority traffic cells;

a first plurality of buffers for temporarily storing and controllably releasing the plurality of channel-specific streams of broadcast-priority traffic cells, thereby to produce a respective plurality of paced channel-specific streams of broadcast-priority traffic cells;

means for combining the paced channel-specific streams of broadcast-priority traffic cells, thereby to produce an ordered stream of broadcast-priority traffic cells;

means for separating the traffic cells in the stream of high-priority traffic cells according to destination drop, thereby to produce a plurality of drop-specific streams of high-priority traffic cells;

a second plurality of buffers for temporarily storing and controllably releasing the plurality of drop-specific streams of high-priority traffic cells, thereby to produce a respective plurality of paced drop-specific streams of high-priority traffic cells;

means for combining the paced drop-specific streams of high-priority traffic cells, thereby to produce an ordered stream of high-priority traffic cells;

means for separating the traffic cells in the stream of low-priority traffic cells according to destination drop, thereby to produce a plurality of drop-specific streams of low-priority traffic cells;

a third plurality of buffers for temporarily storing and controllably releasing the plurality of drop-specific streams of low-priority traffic cells, thereby to produce a respective plurality of paced drop-specific streams of low-priority traffic cells;

means for combining the paced drop-specific streams of low-priority traffic cells, thereby to produce an ordered stream of low-priority traffic cells; and means for combining the ordered stream of broadcast-priority traffic cells, the ordered stream of high-priority traffic cells and the ordered stream of low-priority traffic cells, thereby to produce the output stream.

30. An HDT according to claim 25, wherein the HDT control processor and traffic shaping control processor are identical.

31. An HDT according to claim 26, wherein the HDT control processor and traffic shaping control processor are identical.

32. An HDT according to claim 27, wherein the HDT control processor and traffic shaping control processor are identical.

33. An HDT according to claim 28, wherein the HDT control processor and traffic shaping control processor are identical.

34. An HDT according to claim 29, wherein the HDT control processor and traffic shaping control processor are identical.

35. An access system comprising:

a host digital terminal (HDT) for connection to a core network; and a plurality of optical network units (ONUs) connected by optical fiber to the HDT, each ONU being connectable to a respective plurality of subscribers by a respective plurality of subscriber drops;

wherein the HDT comprises a traffic shaper for transmitting an output data stream from the HDT to the subscribers, the traffic shaper comprising control means for determining the bandwidth available on the fiber and on the subscriber drops; and remapping means for controllably reordering and releasing an input stream of traffic cells in accordance with the bandwidth available on the fiber and on the subscriber drops, thereby to form the output data stream.

36. An access system, comprising:

a plurality of optical network units (ONUs), each ONU being connectable to a respective plurality of subscribers by a respective plurality of subscriber drops; and a host digital terminal (HDT) connected by optical fiber to the ONUs and being connectable to a core network, for relaying downstream data from the core network to the ONUs and for relaying upstream data from the ONUs to the core network;

wherein the HDT comprises a first plurality of optoelectronic converters for exchanging upstream and downstream traffic cells with a core network via optical fiber; a digital switch matrix connected to the first plurality of optoelectronic converters, for routing the upstream and downstream traffic cells to and from the core network in accordance with a controllable routing map; an HDT control processor connected to the digital switch matrix for controlling the routing map of the digital switch matrix; a plurality of base stations for formatting the downstream traffic cells into downstream subframes comprising a control channel containing control information and a traffic channel containing the downstream traffic cells, and for formatting upstream subframes received from the ONUs into upstream traffic cells; a second plurality of optoelectronic converters for exchanging subframes with the ONUs; and a traffic shaper connected between the digital switch matrix and the second plurality of optoelectronic converters, for controlling the transmission of downstream traffic cells, the traffic shaper comprising control means for determining the bandwidth available on the fiber and on the subscriber drops, and remapping means for controllably reordering and releasing an input stream of downstream traffic cells received from the digital switch matrix in accordance with the bandwidth available on the fiber and on the subscriber drops, thereby to form an output stream of downstream traffic cells delivered to a corresponding one of the second plurality of base stations; and wherein each ONU comprises an optoelectronic converter connected to the optical fiber joining that ONU to the HDT; an out station connected to the optoelectronic converter for formatting the downstream subframes arriving from the HDT into a stream of intermittent downstream traffic cells and for formatting a stream of upstream traffic cells arriving from the corresponding subscriber drops into upstream subframes; a demultiplexer connected to the out station means for determining which drop among the subscriber drops connected to that ONU each downstream traffic cell is destined for; a plurality of line cards connected to the demultiplexer, each line card comprising a downstream buffer for temporarily storing the downstream traffic cells arriving from the HDT, interface means for interfacing to the associated subscriber drop, an upstream buffer for storing the upstream traffic cells arriving from the subscriber drop; a multiplexer connected to the line cards, for combining the traffic cells arriving on each of the line cards into the stream of upstream traffic cells; and a anti-jitter buffer having a corresponding length connected between the multiplexer and the out station for temporarily storing the stream of upstream traffic cells prior tp transmission by the ONU.

37. An access system according to claim 36, wherein the ONU further comprises an ONU control processor connected to the out station and to the demultiplexer; wherein the demultiplexer in the ONU has a mapping that is modifiable by the ONU control processor; wherein the instant of transmission of upstream subframes by the ONU is controllable by the ONU control processor; wherein the ONU control processor is controllable by control information present in the control channel of downstream subframes received from the HDT.

38. An access system according to claim 37, wherein each line card comprises a queue control block connected to its upstream buffer and connected to the ONU control processor in the associated ONU, for notifying the ONU control processor as to the level to which its upstream buffer is full.

\* \* \* \* \*